United States Patent
Rhodes et al.

(10) Patent No.: US 12,097,920 B2
(45) Date of Patent: Sep. 24, 2024

(54) SNOWMOBILE CONTROL SYSTEM

(71) Applicant: Polaris Industries Inc., Medina, MN (US)

(72) Inventors: Trevor F. Rhodes, Badger, MN (US); Benjamin T. Edwards, Roseau, MN (US); Michael A. Hedlund, Roseau, MN (US); Joseph D. Tharaldson, Taylors Falls, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/311,466

(22) Filed: May 3, 2023

(65) Prior Publication Data

US 2023/0271661 A1     Aug. 31, 2023

Related U.S. Application Data

(62) Division of application No. 16/723,806, filed on Dec. 20, 2019, now abandoned.

(51) Int. Cl.
*B62J 33/00* (2006.01)
*B62J 6/01* (2020.01)
(Continued)

(52) U.S. Cl.
CPC .......... *B62J 33/00* (2013.01); *B62J 6/01* (2020.02); *B62J 6/16* (2013.01); *B62J 45/20* (2020.02);
(Continued)

(58) Field of Classification Search
None
See application file for complete search history.

(56) References Cited

U.S. PATENT DOCUMENTS

| | | |
|---|---|---|
| 5,757,165 A | 5/1998 | Minks |
| 6,114,668 A | 9/2000 | Ogata et al. |
| 6,770,848 B2 | 8/2004 | Haas et al. |
| 7,214,906 B1 | 5/2007 | Hansen et al. |

(Continued)

FOREIGN PATENT DOCUMENTS

| | | | |
|---|---|---|---|
| CA | 2444325 A1 * | 4/2005 | ........... B01D 53/228 |
| EP | 1555198 A1 | 7/2005 | |

OTHER PUBLICATIONS

Office Action issued in corresponding Canadian Patent Application 3,103,012 dated Jan. 26, 2023.

*Primary Examiner* — Daniel L Greene
(74) *Attorney, Agent, or Firm* — Harness, Dickey & Pierce, P.L.C.

(57) ABSTRACT

A snowmobile including a warming element at a handlebar of the snowmobile. The warming element is configured to generate heat in response to electrical current driven therethrough. A user interface is configured to receive inputs from an operator of the snowmobile. The inputs include a first temperature input setting a first predetermined temperature for the warming element. A control assembly includes a warmer control button configured for setting the warming element at the first predetermined temperature. A control module is included with the control assembly and in receipt of inputs from the user interface and the control assembly. The control module is configured to, when the first predetermined temperature is selected by way of the warmer control button, direct sufficient electrical current to the warming element to generate heat equal to the first predetermined temperature.

8 Claims, 26 Drawing Sheets

(51) Int. Cl.
  *B62J 6/16* (2020.01)
  *B62J 45/20* (2020.01)
  *B62J 45/422* (2020.01)
  *B62J 50/22* (2020.01)
  *B62K 21/26* (2006.01)
  *H05B 1/02* (2006.01)
  *B62J 6/015* (2020.01)
  *B62J 6/22* (2020.01)
  *B62M 27/02* (2006.01)
  *G01K 3/00* (2006.01)

(52) U.S. Cl.
  CPC ............. *B62J 45/422* (2020.02); *B62J 50/22* (2020.02); *B62K 21/26* (2013.01); *H05B 1/0236* (2013.01); *B62J 6/015* (2020.02); *B62J 6/22* (2020.02); *B62M 27/02* (2013.01); *G01K 3/005* (2013.01)

(56) References Cited

U.S. PATENT DOCUMENTS

| | | | |
|---|---|---|---|
| 11,458,795 B1* | 10/2022 | Gagnon | B60G 15/067 |
| 2003/0226836 A1* | 12/2003 | Miura | B62K 21/26 |
| | | | 219/202 |
| 2004/0007567 A1 | 1/2004 | Downey et al. | |
| 2004/0084292 A1 | 5/2004 | Janisch | |
| 2006/0219686 A1 | 10/2006 | Oishi et al. | |
| 2008/0053979 A1* | 3/2008 | Toya | A61H 23/0263 |
| | | | 219/385 |
| 2010/0097325 A1 | 4/2010 | Nagao et al. | |
| 2010/0280751 A1 | 11/2010 | Breed | |
| 2011/0074689 A1* | 3/2011 | Sentchenkoff | B62K 11/14 |
| | | | 345/168 |
| 2013/0212765 A1 | 8/2013 | Cornelius | |
| 2019/0061574 A1* | 2/2019 | Schwintek | B60N 2/5657 |
| 2019/0071145 A1 | 3/2019 | Yamamoto | |
| 2019/0208836 A1* | 7/2019 | Demers | H05B 3/342 |
| 2019/0256161 A1 | 8/2019 | Dobrinin et al. | |
| 2020/0114999 A1 | 4/2020 | Rhodes | |

\* cited by examiner

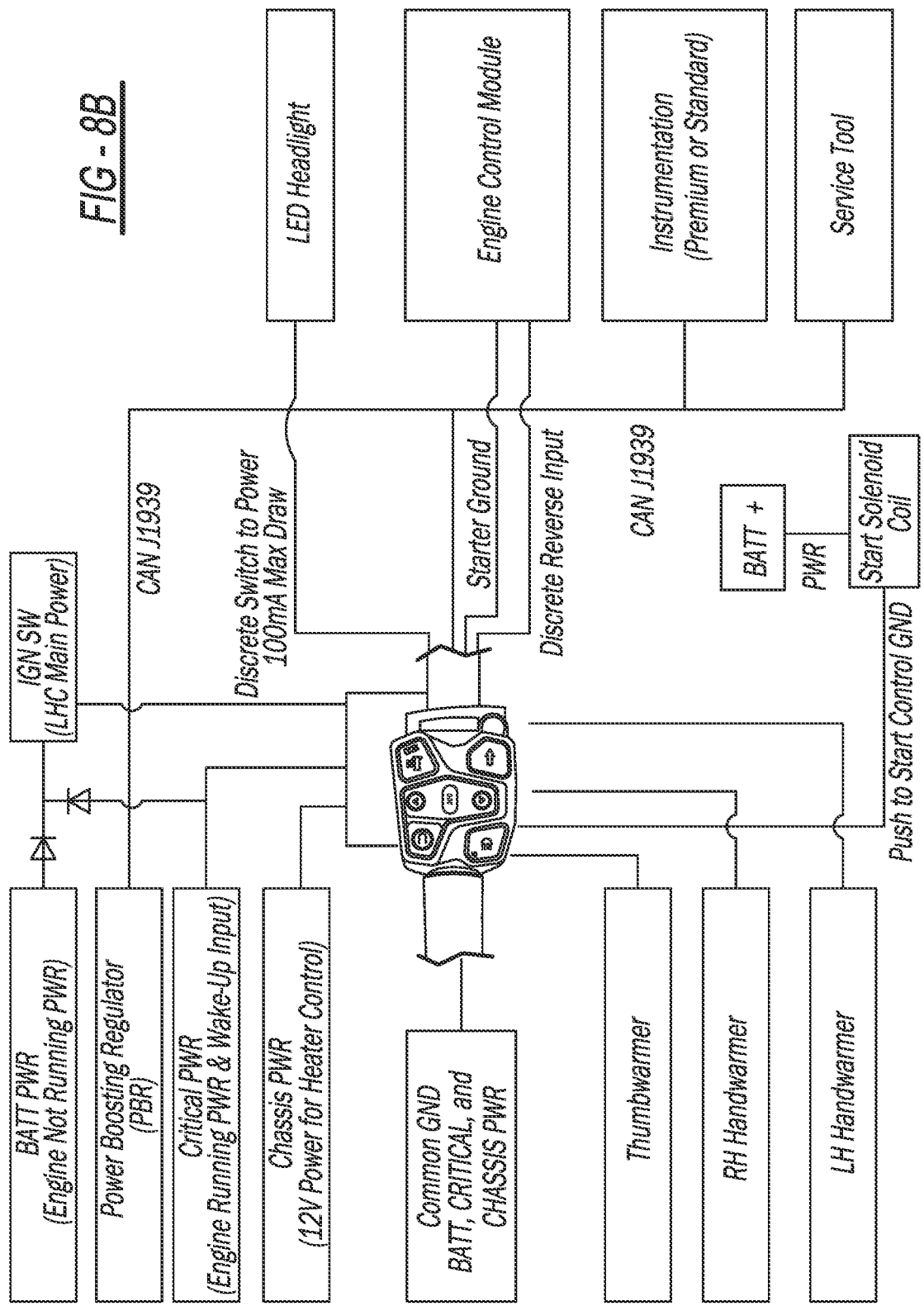

SNOWMOBILE CONTROL SYSTEM

CROSS-REFERENCE TO RELATED APPLICATIONS

This application is a divisional of U.S. patent application Ser. No. 16/723,806 filed on Dec. 20, 2019. The entire disclosure of the above application is incorporated herein by reference.

FIELD

The present disclosure relates to a snowmobile, and more particularly to a control system for a snowmobile.

BACKGROUND

This section provides background information related to the present disclosure, which is not necessarily prior art.

A snowmobile is a motorized vehicle designed for winter travel and recreation, for example. A snowmobile may be operated on snow and ice, and does not require a road or trail. While current snowmobiles are suitable for their intended use, they are subject to improvement. For example, while some snowmobiles include hand and thumb warmers, the operator's ability to customize the amount of heat generated by the warmers is extremely limited. Furthermore, while some snowmobiles include display screens to convey information to the operator, existing screens are prone to false touches due to buildup of contaminants on the screen, such as snow and other debris. Existing displays are also subject to lengthy boot-up processes, which are an inconvenience for the operator. The present disclosure is directed to an improved snowmobile including the features and advantages described herein.

SUMMARY

This section provides a general summary of the disclosure, and is not a comprehensive disclosure of its full scope or all of its features.

The present disclosure includes a warming element at a handlebar of the snowmobile. The warming element is configured to generate heat in response to electrical current driven therethrough. A user interface is configured to receive inputs from an operator of the snowmobile. The inputs include a first temperature input setting a first predetermined temperature for the warming element. A control assembly includes a warmer control button configured for setting the warming element at the first predetermined temperature. A control module is included with the control assembly and in receipt of inputs from the user interface and the control assembly. The control module is configured to, when the first predetermined temperature is selected by way of the warmer control button, direct sufficient electrical current to the warming element to generate heat equal to the first predetermined temperature.

The present disclosure is further directed to a snowmobile including a warming element at a handlebar of the snowmobile, the warming element configured to generate heat in response to electrical current driven therethrough. A control assembly is mounted to the handlebar. The control assembly includes a warming element control button configured to control the warming element. A driver is included in the control assembly. The driver is configured to drive electrical current to the warming element. A control module is included with the control assembly mounted to the handlebar and in receipt of inputs from the control assembly. The control module is configured to, when the warming element is activated by way of the warming element control button, direct electrical current to the warming element to heat the warming element.

The present disclosure is also directed to a snowmobile including a warming element at a handlebar of the snowmobile. The warming element is configured to generate heat in response to electrical current driven therethrough. A display is configured to receive touch inputs from an operator of the snowmobile for controlling the warming element. A control assembly is mounted to the handlebar. The control assembly includes a warmer control button configured for controlling the warming element. A control module is included with the control assembly and in communication with the display to provide feedback messages to the operator. The control module is configured to direct sufficient electrical current to the warming element to heat the warming element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 8B illustrates power to the left hand control panel and various other features of, and related to, the left hand control panel;

Corresponding reference numerals indicate corresponding parts throughout the several views of the drawings.

DETAILED DESCRIPTION

Figure 1:
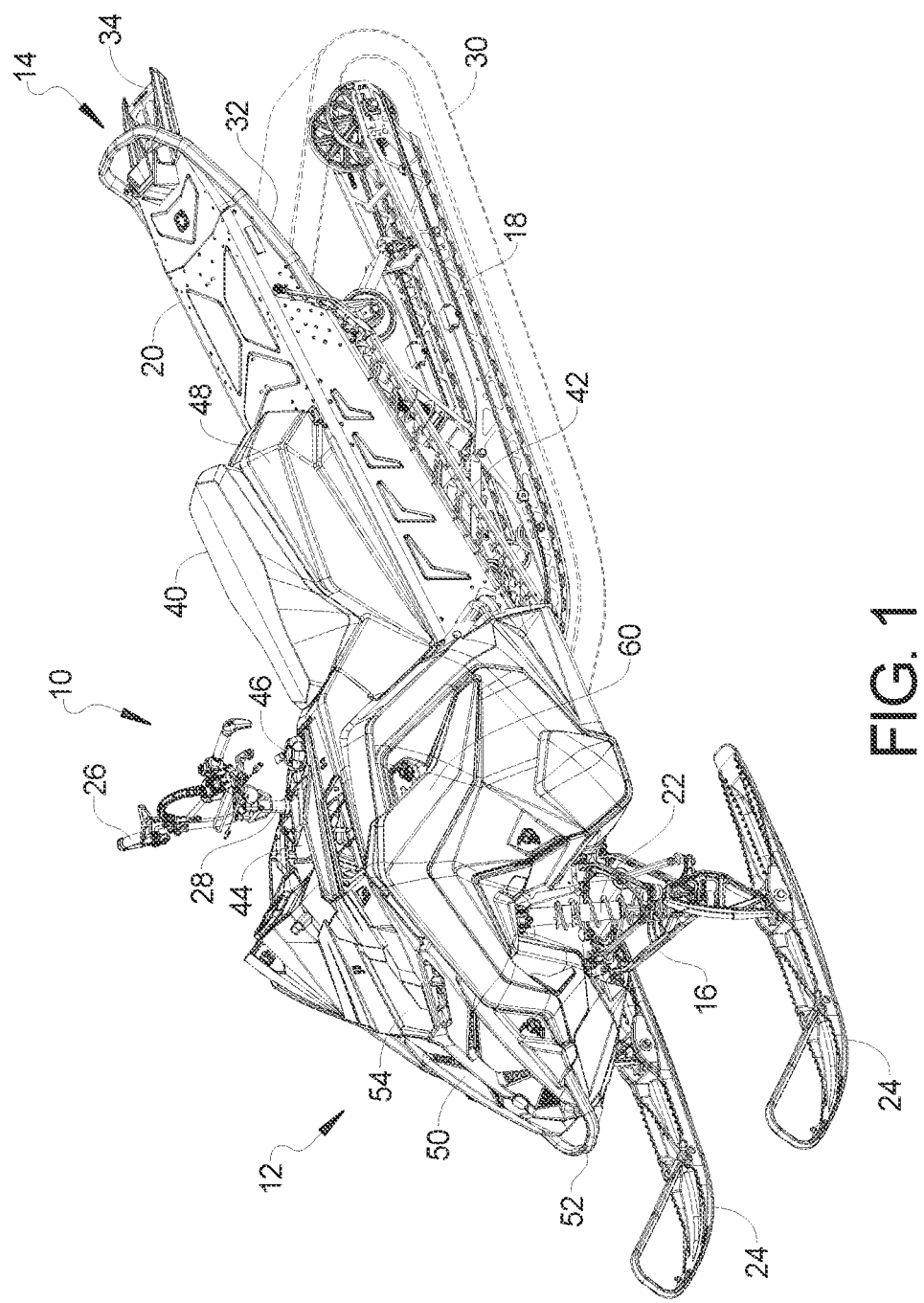
FIG. 1 is a perspective view of an exemplary snowmobile in accordance with the present disclosure.
Figure 2:
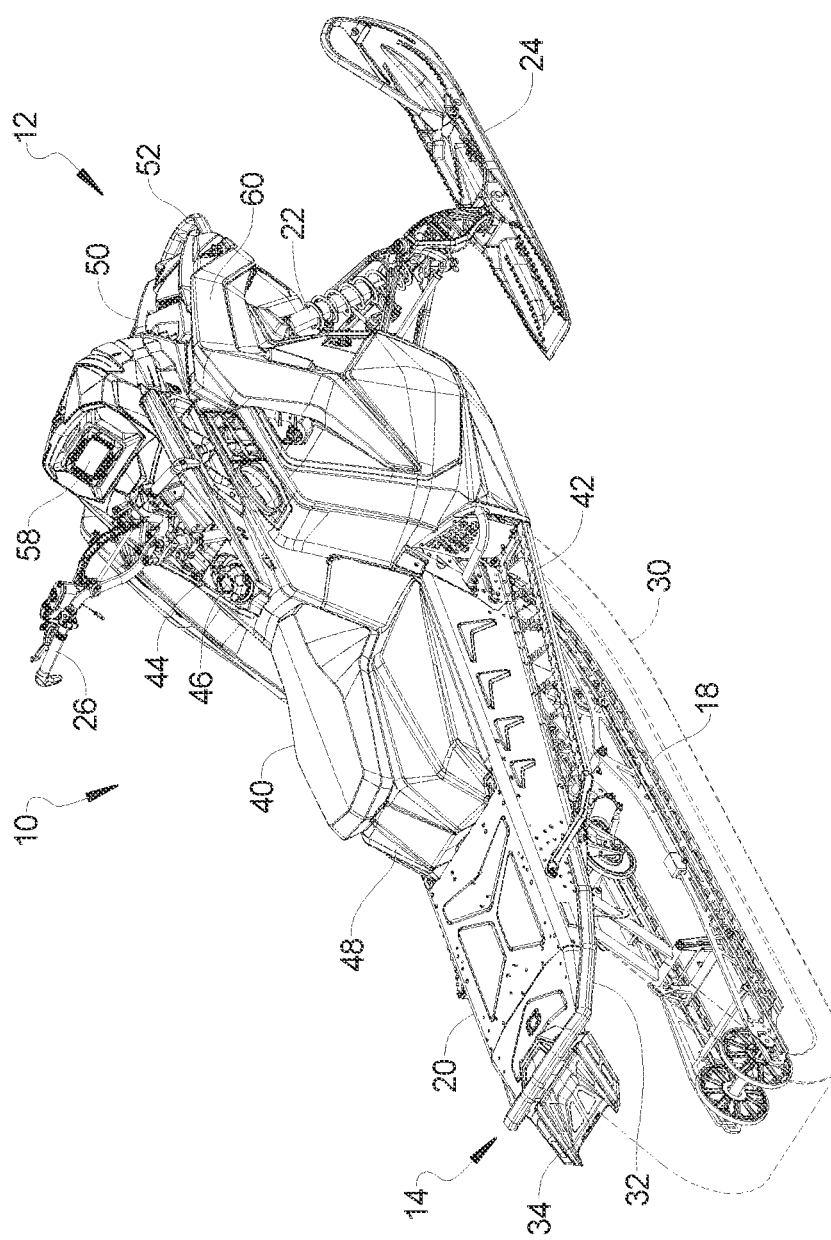
FIG. 2 is another perspective view of the snowmobile.
Figure 3:
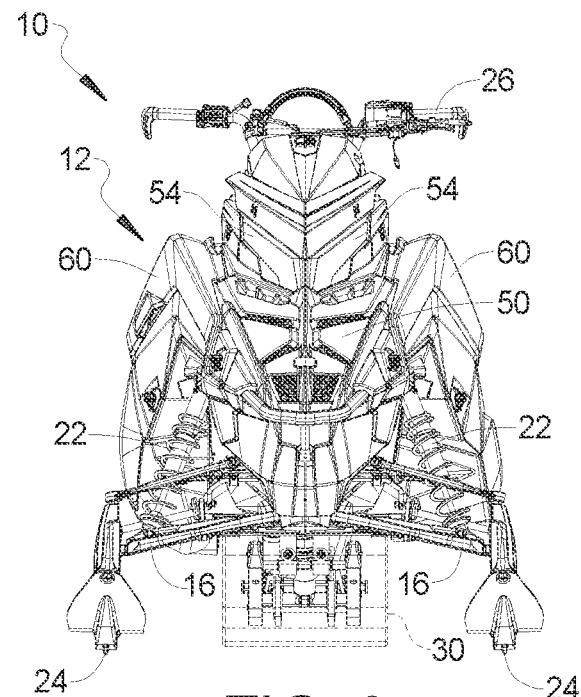
FIG. 3 is a front view of the snowmobile.
Figure 4:
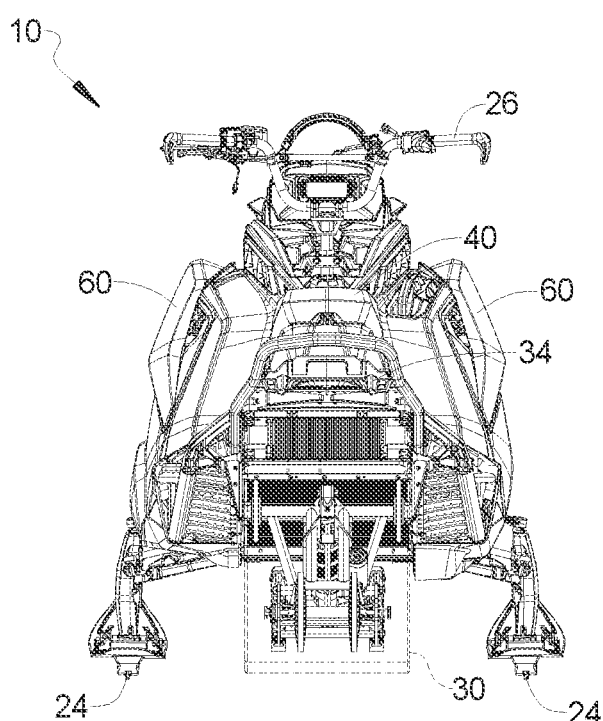
FIG. 4 is a rear view of the snowmobile.
Figure 5:
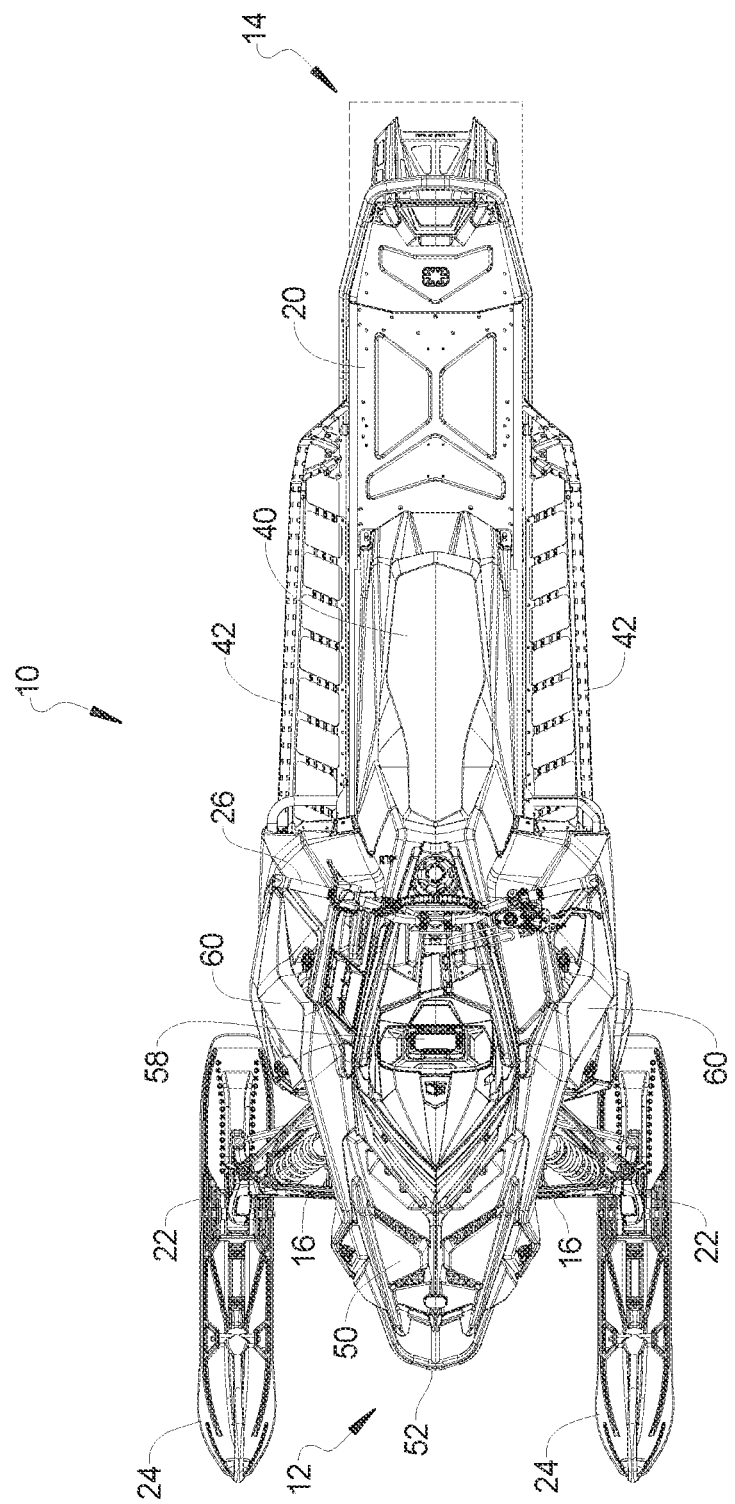
FIG. 5 is a top view of the snowmobile.

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32 is tapered at the rear end 14. Mounted at the rear end 14 is a flap 34, which blocks snow and other debris from being "kicked-up" by the track 30.

Mounted to the chassis 20 and atop the tunnel 32 is a seat 40 for the operator of the snowmobile 10. On both sides of the chassis 20 or tunnel 32 are footrests 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40.

At the front end 12 of the snowmobile 10 is a hood assembly 50, which is mounted on top of a nose pan 68. Mounted to the hood assembly 50 and protruding from a forwardmost end thereof is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly are body panels 60, which are advantageously interchangeable.

Figure 6:
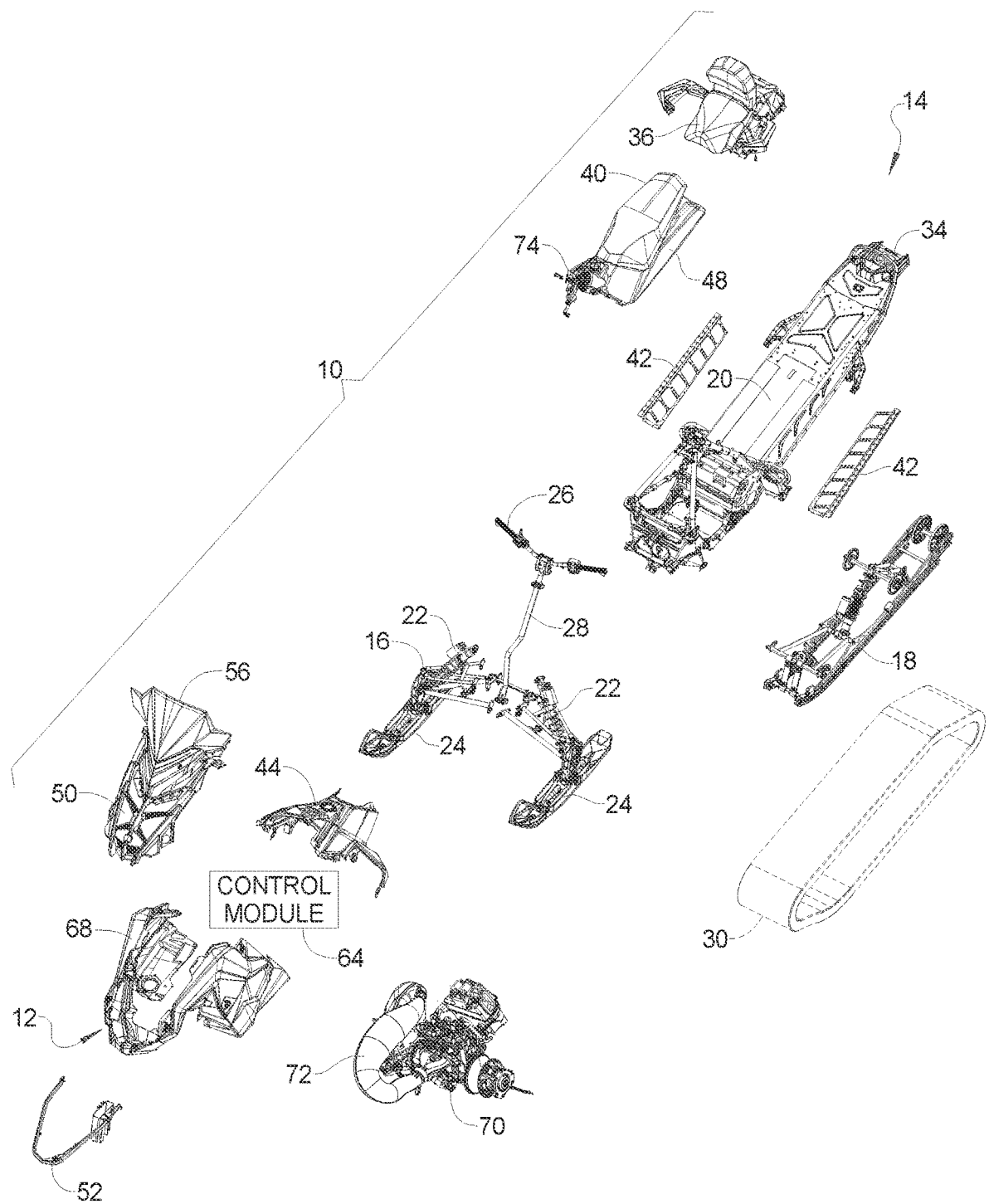
FIG. 6 is an exploded view of the snowmobile.

With particular reference to FIG. 6, the snowmobile 10 further includes an engine assembly 70. The engine assembly 70 generates power for driving the track 30. The engine assembly 70 may include any suitable engine, such as a two-stroke engine, a four-stroke engine (with or without a turbocharger), an 850 cc engine, etc. Coupled to the engine assembly 70 is any suitable exhaust assembly 72. Oil for the engine assembly 70 is stored in an oil tank assembly 74, which may be arranged proximate to the seat 40.

The snowmobile 10 further includes one or more control modules 64. For example, a control module 64A (see FIG. 8A) may be included within a display assembly of the display 58, and a control module 64B (see FIG. 9) may be included in a control assembly 66 mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 7A:
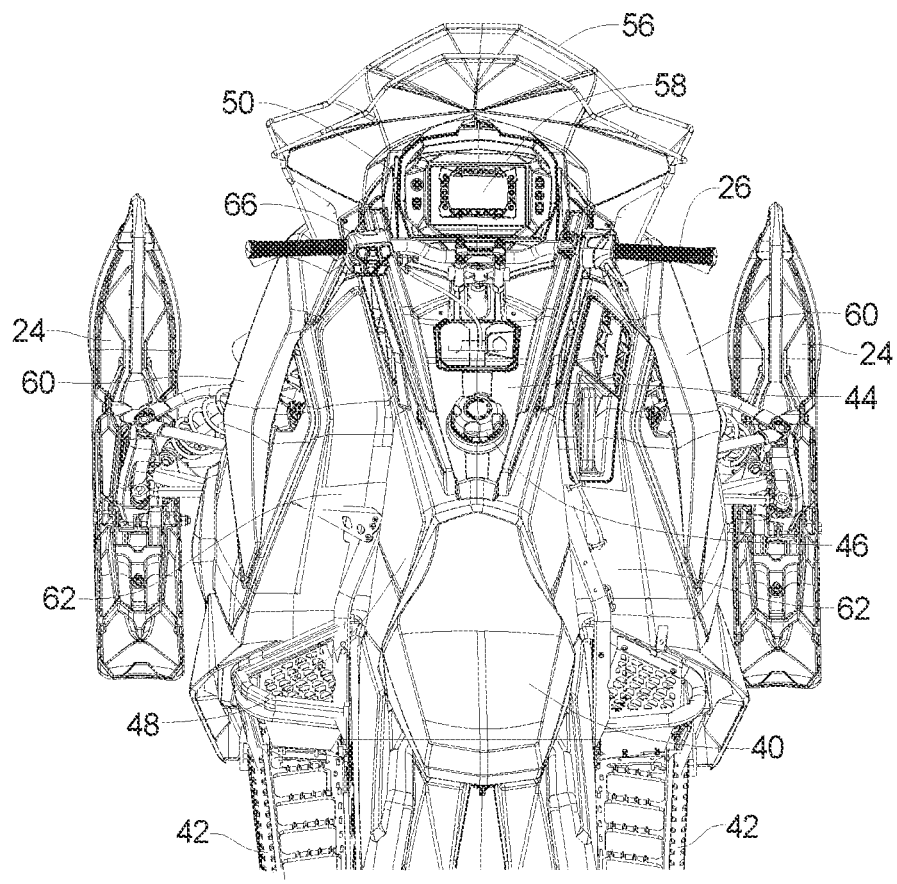
FIG. 7A is a top view of a center console of the snowmobile.

FIG. 7A is a cockpit view generally taken from the viewpoint of the operator looking towards the display 58 and the skis 24. When seated on the seat 40, the operator will generally have his or her feet on the footrest 42. In some instances, the operator may operate the snowmobile 10 in a standing position. Shin rests 62 (see FIGS. 7A and 7B, for example) are on opposite sides of the center console 44, and provide convenient surfaces for the operator to rest his/her shins when operating the snowmobile 10 in a standing, or partially standing, position. Regardless of the operator's position, he or she has easy access to the handlebars 26 and a control assembly mounted thereto, such as left hand control assembly 66 mounted to a left one of the handlebars 26.

Figure 7B:
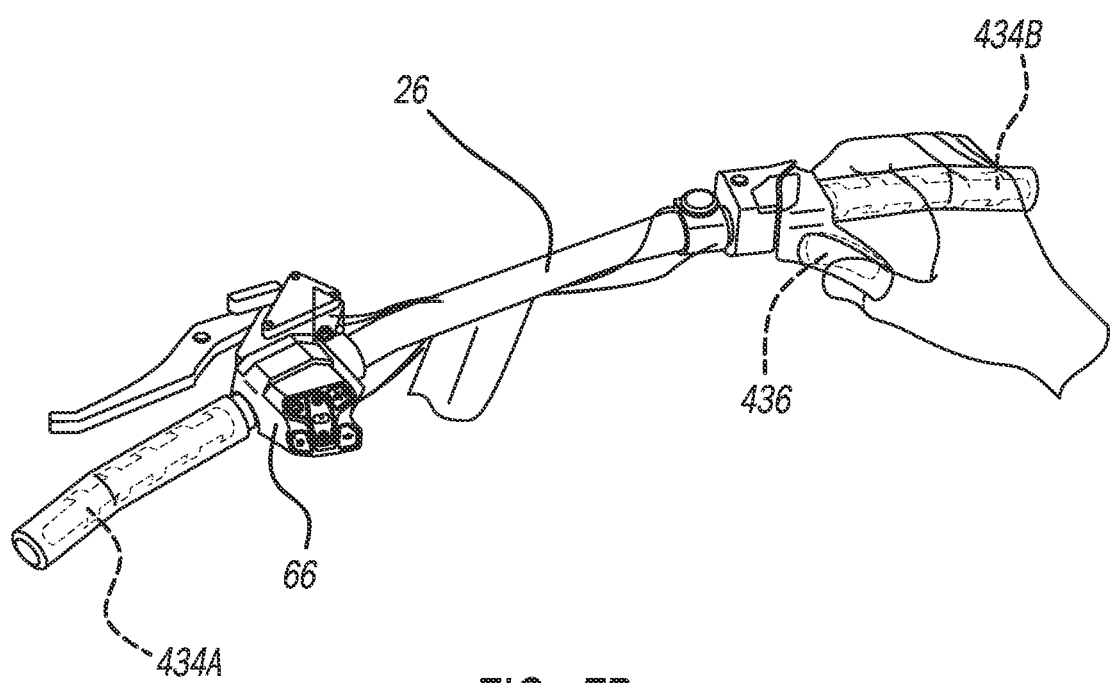
FIG. 7B illustrates hand and thumb warmers on handlebars of the snowmobile.
Figure 8A:
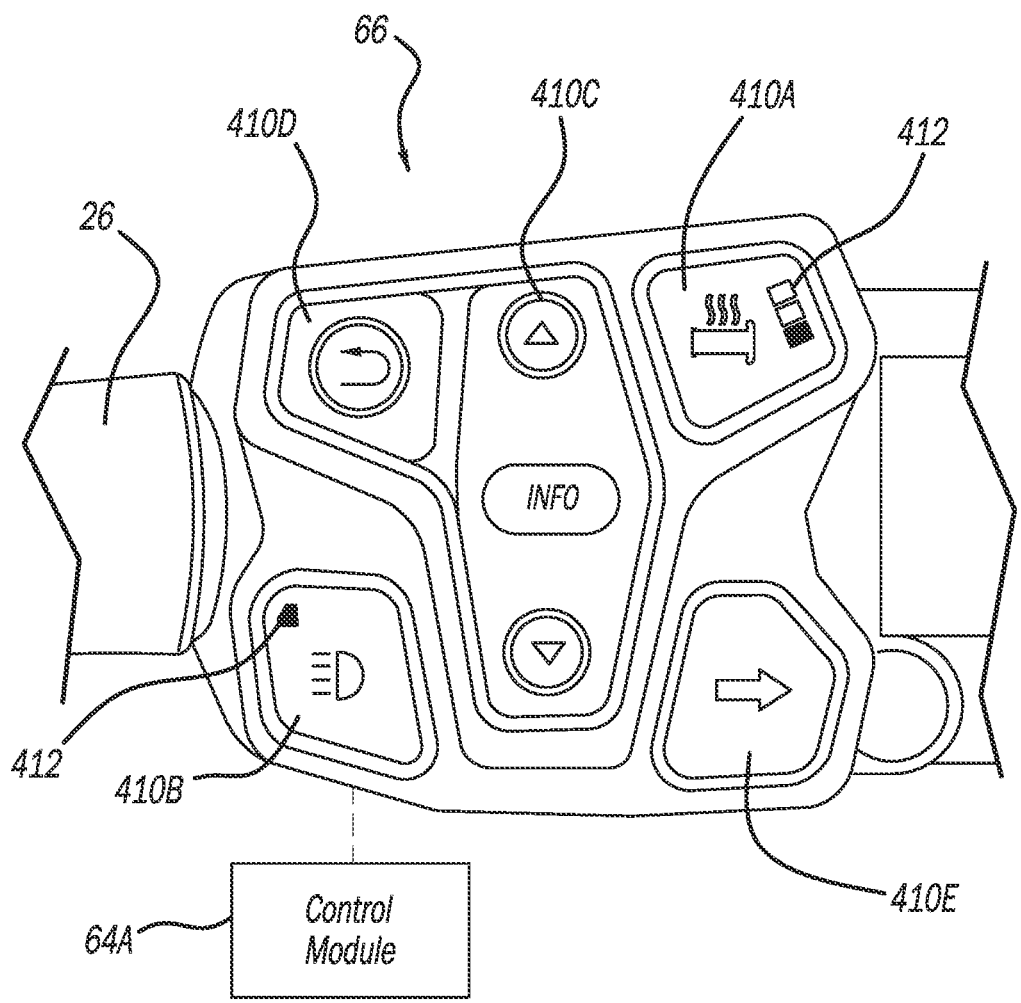
FIG. 8A is a plan view of a left hand control panel mounted to the left handle bar of the snowmobile.

FIGS. 7B, 8A and 8B illustrate an exemplary left hand control assembly 66 in accordance with the present disclosure. Although the left hand control assembly 66 is illustrated and described as mounted to the left handle bar 26, the left hand control assembly 66 may be configured to be mounted to, and mounted to, the right handle bar 26. The left hand control assembly 66 includes a plurality of buttons and/or switches for controlling various functions of the snowmobile 10. Any suitable number and configuration of buttons and/or switches may be included. The control assembly 66 is sealed to prevent outside contaminates from damaging the control assembly 66 and the contents thereof. The buttons may be covered with any watertight material, such as silicon, a suitable polymeric or rubber material, or any other suitable covering to enhance ease of actuation by the user. Exemplary buttons for controlling exemplary operations of the snowmobile 10 include, but are not limited to, the following: handle bar warmers 410A; high beams 410B; infotainment control 410C; return 410D; and forward 410E. For snowmobiles including electric start functionality, an electric start button may also be included. A button for controlling electric shocks may also be included.

One or more of the buttons may include status indicators, such as LED indicators or any other suitable indicators. For example and with respect to the handle bar warmer button 410A, three LED lights 412 may be included. The LED lights 412 may indicate whether the handle bar warmers are at a low, medium or high heat setting. Another LED light 412 may be included at the headlight button 410, such as to indicate whether the headlights are on or off.

As illustrated in FIG. 8A, the left hand control assembly 66 may include the control module 64A, which functions as a vehicle control unit and controls various features of the snowmobile 10. The control module 64A may alternatively be arranged at any other suitable location about the snowmobile 10. Operation of the control module 64A to control various features of the snowmobile 10 is described herein, such as with respect to control of the handle bar warmers.

With particular reference to FIG. 7B, the handle bars 26 may include any suitable hand warmers, such as a left hand warmer 434A for the left handle bar 26, a right hand warmer 434B for the right handle bar 26, and a thumb warmer 436 for the operator's right thumb. Any suitable handle bar warmers may be used, such as those disclosed in U.S. patent application Ser. No. 16/156,548 titled "Temperature Sensing and Control System and Method," which was filed on Oct. 10, 2018 and is assigned to Polaris Industries Inc. of Medina, Minnesota. The entire disclosure of application Ser. No. 16/156,548 is incorporated by reference herein.

In addition to, or in place of, the warmers 434A, 434B and 436, any other suitable warmers may be included. For example, the following warmers may also be included: brake handle warmer; storage compartment warmer; goggles warmer; garment warmer; windshield warmer; helmet shield warmer; seat warmer; etc. The description of the operation of the warmers 434A, 434B, 436 set forth herein also applies to the additional warmers listed in the preceding sentence, as well as to any other suitable warmers.

Figure 9:
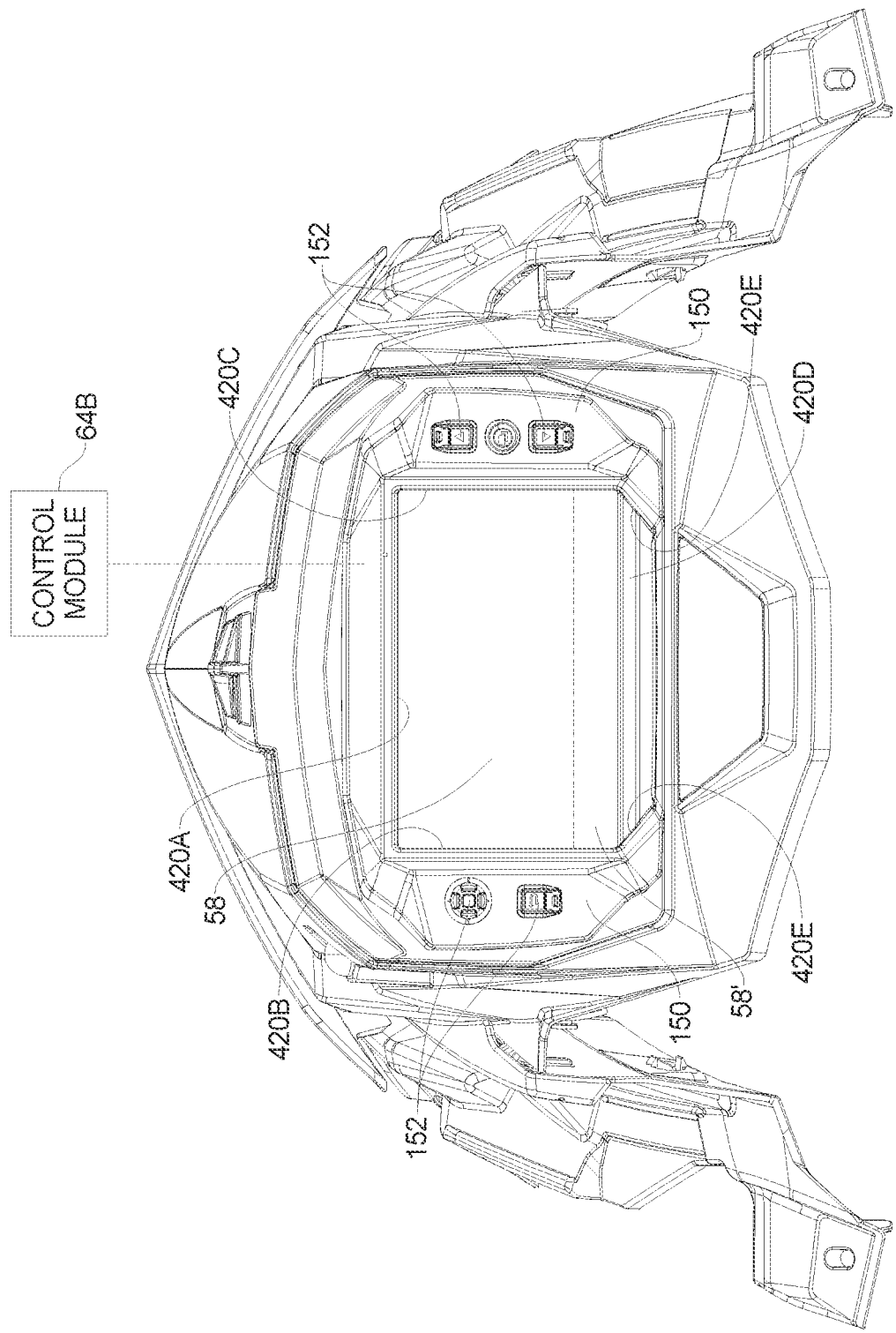
FIG. 9 illustrates a display assembly of the snowmobile.

The display 58 may be any suitable touch screen having any suitable size, such as 7" diagonally. With reference to FIG. 9, the display 58 includes the control module 64B, which controls various functions of the display 58 and the display assembly associated therewith. For example, the control module 64B may operate an operating system of the display 58, may identify location of the snowmobile based on inputs from GPS receiver 440 (see FIG. 11), and may control any other suitable functions and features as well.

As illustrated in FIG. 9, surrounding the display 58 is an upper bezel 420A, a left hand bezel 420B, a right hand bezel 420C, and a lower bezel 420D. Each one of the upper bezel 420A, the left hand bezel 420B, and the right-hand bezel 420C have a similar, or the same, height. Thus, the display 58 is recessed beneath each one of the upper bezel 420A, the left hand bezel 420B and the right hand bezel 420C at a common distance.

The lower bezel 420D is not as tall as (or is more shallow than) each one of the upper bezel 420A, the left hand bezel 420B, and the right hand bezel 420C. In some applications, the lower bezel 420D may not be present at all. To the left and right of the lower bezel 420D are corner bezels 420E. The corner bezels 420E are angled inward toward the lower bezel 420D. Specifically, the left corner bezel 420E extends from the left hand bezel 420B to the lower bezel 420D. The right corner bezel 420E extends from right hand bezel 420C to the lower bezel 420D. The corner bezels 420E may have the same height as the lower bezel 420D, or may have the same height as the left and right hand bezels 420B, 420C. Alternatively, the corner bezels 420E may gradually decrease in height from the left and right hand bezels 420B, 420C to the lower bezel 420D.

The relatively lower or shallow height of the lower bezel 420D (and optionally the corner bezels 420E) reduces the buildup of, and facilitates removal of, snow and other contaminates at the lower portion of the display 58. For example, current snowmobile displays are surrounded by a bezel that is uniform in height around the display. As a result, snow and other contaminates often build up on the lower bezel, and the height of existing bezels at the bottom portion thereof makes it difficult to wipe away or otherwise remove the snow and contaminates. Advantageously, the lower bezel 420D of the present disclosure is relatively short and shallow (or not present at all) thereby making it easier to wipe snow and other contaminates off of the display 58.

The display 58 includes a lower portion 58', which is adjacent to the lower bezel 420D. The lower portion 58' is the bottom fifth of the display 58 and extends about 0.25"-0.50" from the lower bezel 420D. Although the relatively shallow lower bezel 420D helps to prevent or lessen buildup of snow and other contaminates at the lower portion 58' of the display 58, some buildup may occur. Buildup of snow and contaminates at the lower portion 58' may result in the display 58 sensing false touch inputs. To lessen or eliminate the occurrence of false inputs caused by snow, contaminates, or other foreign objects at the lower portion 58', the lower portion 58' is configured with a sensitivity level that is reduced as compared to the rest of the display 58. The lower portion 58' may always be provided with reduced sensitivity or the user may select a reduced sensitivity mode for the lower portion 58' as conditions warrant.

On opposite sides of the display 58 is a control panel 150, which includes any suitable physical controls 152 for entering commands into the display 58. For example, the controls 152 may be any suitable buttons, knobs, switches, joysticks, etc. The controls 152 may include a pair of up and down switches on the right hand side thereof. The display 58 may be configured such that simultaneous actuation of the up and down switches, for example, places the display 58 in a "lock mode," whereby touch inputs are not accepted, and thus the physical controls 152 must be used to enter inputs. This mode provides numerous advantages, particularly under conditions resulting in the buildup of snow or other contaminates on the display 58, which may cause false inputs.

Figure 10A:
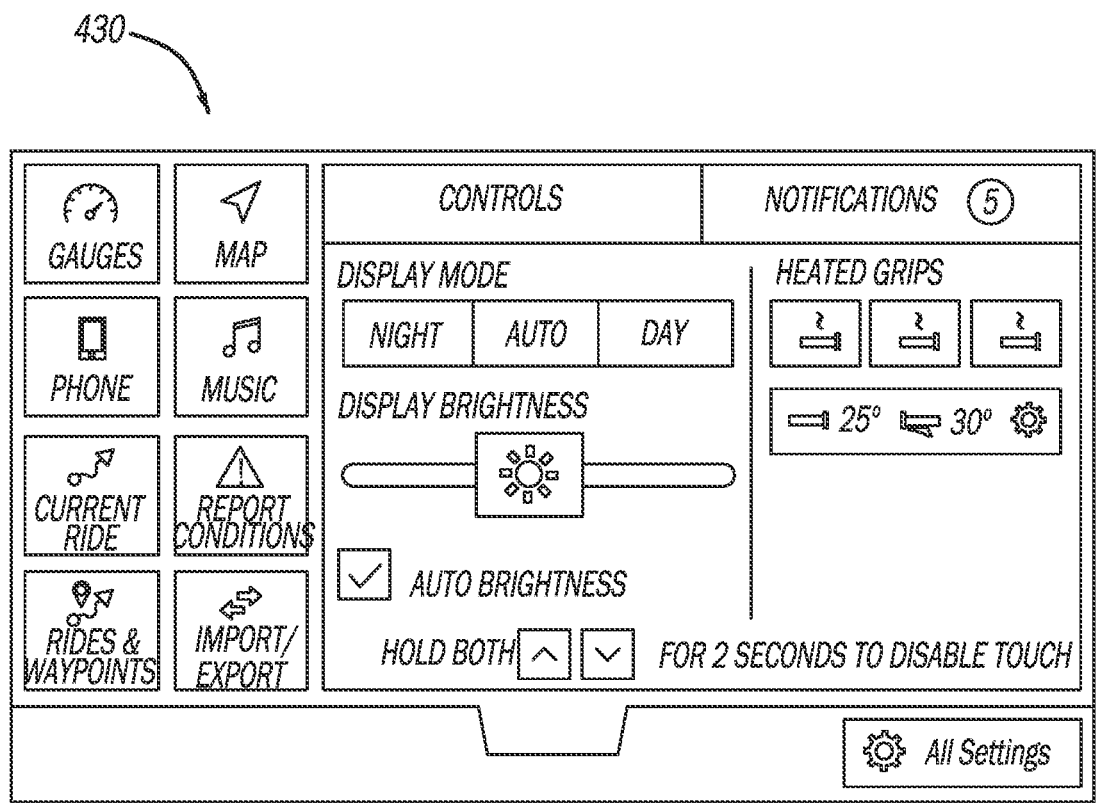
FIG. 10A is an exemplary display screen of the display assembly.

FIG. 10A illustrates an exemplary display screen 430 of the display 58. In the example of FIG. 10A, various features of the snowmobile 10 may be controlled by way of touch inputs, such as the hand warmers 434A, 434B and the thumb warmer 436. As illustrated in FIG. 10A, the hand warmers 434A, 434B may be set to a temperature that is different from the temperature of the thumb warmer 436. Furthermore, each one of the hand warmers 434A, 434B and the thumb warmer 436 may be independently activated or deactivated. In some applications, individual drivers for each of the hand warmers 434A, 434B and the thumb warmer 436 may be included to permit the temperature of the left hand warmer 434A to be set at a different temperature as compared to the right hand warmer 434B.

Figure 10B:
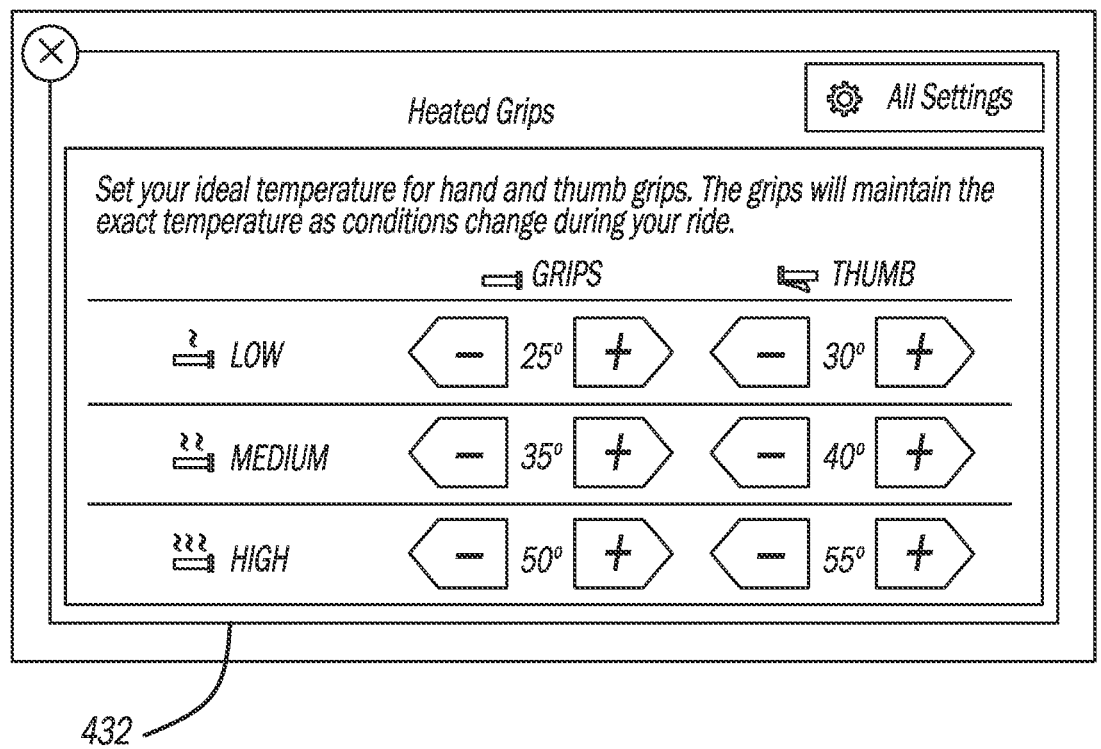
FIG. 10B illustrates another exemplary display screen of the display assembly for hand and thumb warmer control.

Pressing the "settings" button in the heated grips section of display screen 430A results in the display 58 displaying settings page 432 illustrated in FIG. 10B. At the settings page 432, the ideal temperature for the hand warmers 434A, 434B and the thumb warmer 436 can be customized. For example, the hand warmers 434A, 434B may be set such that at the lower setting the hand warmers 434A, 434B are warmed to 25° F., warmed to 35° F. at the medium setting, and warmed to 50° F. at the high setting. The temperature of the thumb warmer 436 may be set differently. For example, the thumb warmer may be set such that at the lower setting, the thumb warmer 436 is heated to 30° F., is heated to 40° F. at the medium setting, and is heated to 55° F. at the high setting. Hand warmer drivers and control of the hand warmers 434A, 434B and the thumb warmer 436 to generate the temperature requested by the user is described herein and illustrated in FIGS. 17, 18A, and 18B.

Figure 11:
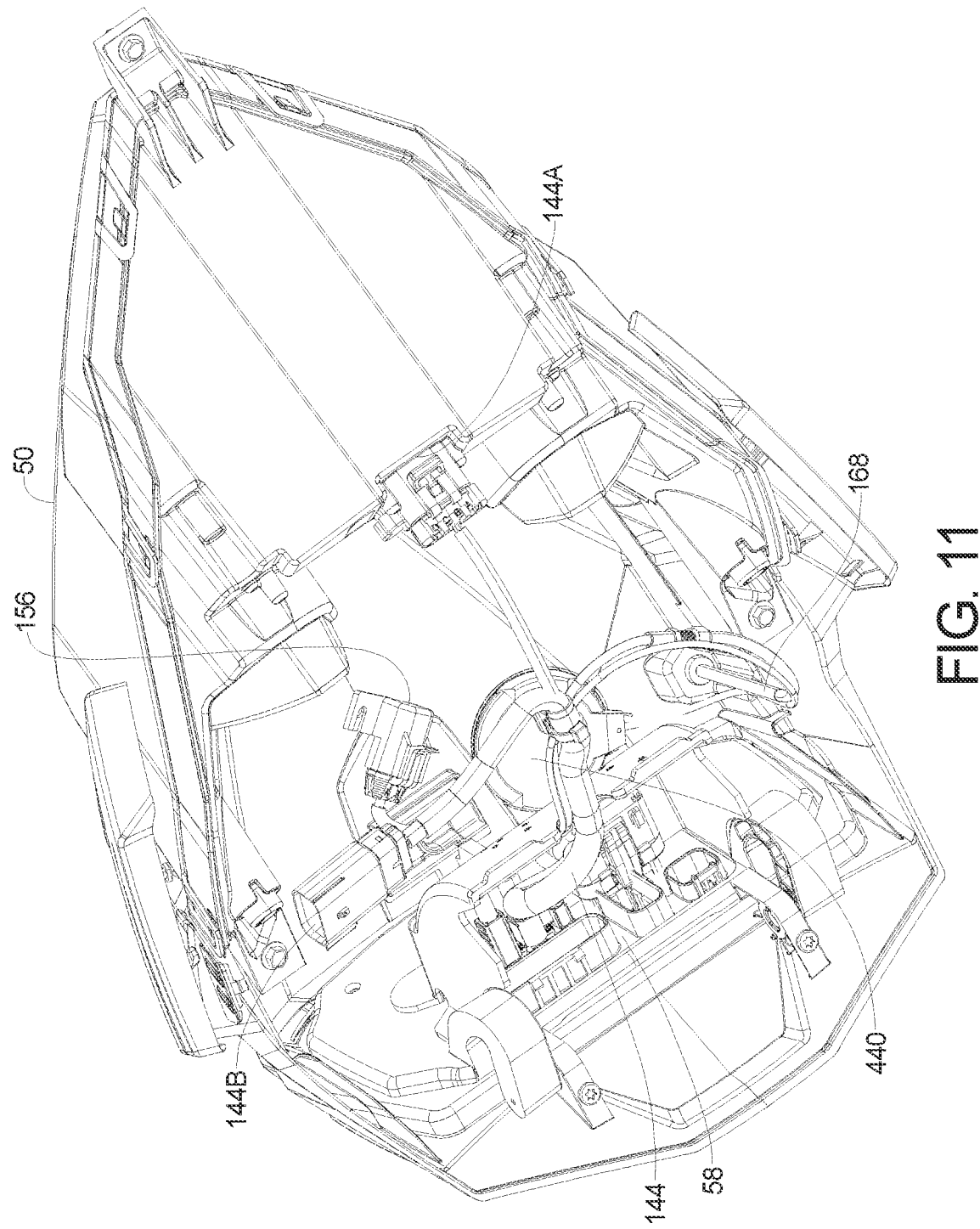
FIG. 11 is a perspective view of an undersurface of a hood assembly of the snowmobile.

FIG. 11 illustrates the undersurface of the hood assembly and the rear of the display 58. Extending from the rear of the display 58 is a wire harness 144. The wire harness 144 connects the display 58 and the control module 64B thereof to various other components of the hood 50, such as, but not limited, to the following: an antenna 168; a GPS receiver 440; a USB port 156; headlights 54 by way of headlight connector 144A; and to the left hand control assembly 66 by way of connector 144B. The left and right hand warmers 434A, 434B and the thumb warmer 436 may be connected directly to the left hand control assembly 66 or indirectly by way of the display 58.

Figure 12:
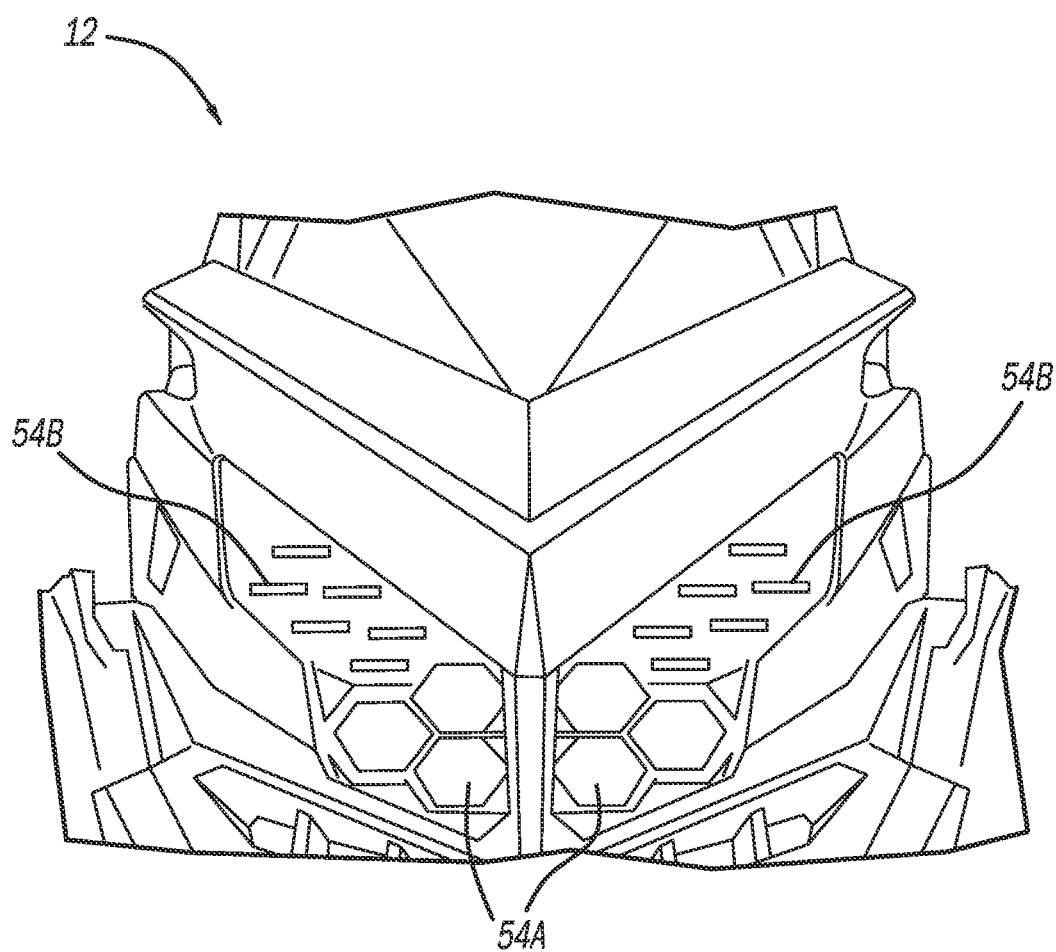
FIG. 12 is a plan view illustrating main headlights and accent lights of the snowmobile.

As illustrated in FIG. 12, the headlights 54 include main headlights 54A and accent lights 54B. The main headlights 54A provide the majority of the forward illumination used to operate the snowmobile 10 at night or in low light conditions, and may also be activated during the day to make the snowmobile 10 more visible to others. The accent lights 54B are relatively low power lights that generate less lumens as compared to the main headlights 54A. The accent lights 54B may be configured to always be illuminated when the snowmobile 10 is being used, as well as for a predetermined period thereafter, as described further herein. The accent lights 54B improve the visibility of the snowmobile 10, and enhance the aesthetics of the snowmobile as well. Operation of the headlights 54A and 54B will be described further herein.

Figure 13:
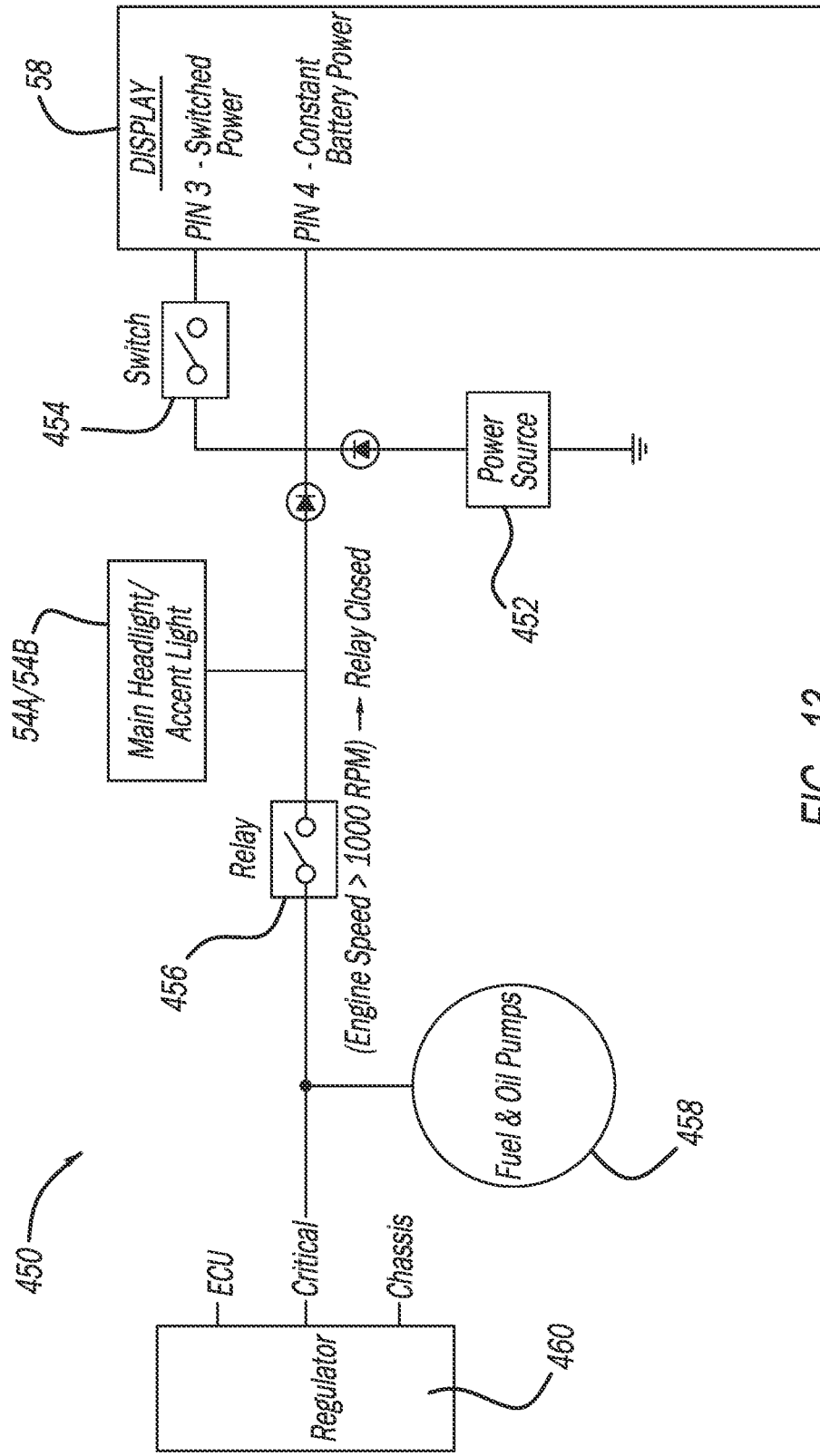
FIG. 13 is a diagram of a power system of the snowmobile.

FIG. 13 illustrates an exemplary power system 450 of the snowmobile 10. The power system 450 includes any suitable power source 452. The power source 452 may be any suitable battery, such as any suitable lithium ion battery, or any suitable capacitor, such as a 7F capacitor. The power source 452 is connected to the display 58 at PIN 3 (switched power) and PIN 4 (constant battery power). Between the power source 452 and the display 58 is any suitable switch 454 such as a keyswitch. The power source 452 is further connected to the main headlights 54A and the accent lights 54B.

The power system 452 further includes a relay switch 456. At an engine speed greater than 1,000 RPM, the relay switch 456 closes in order to power the main headlights 54A and accent lights 54B by chassis power. The power system 450 further powers fuel and oil pumps 458 and may include an optional regulator 460. Any suitable regulator may be used, such as a PBR (power boost regulator). The power system 450 is described in greater specificity herein.

Figure 14:
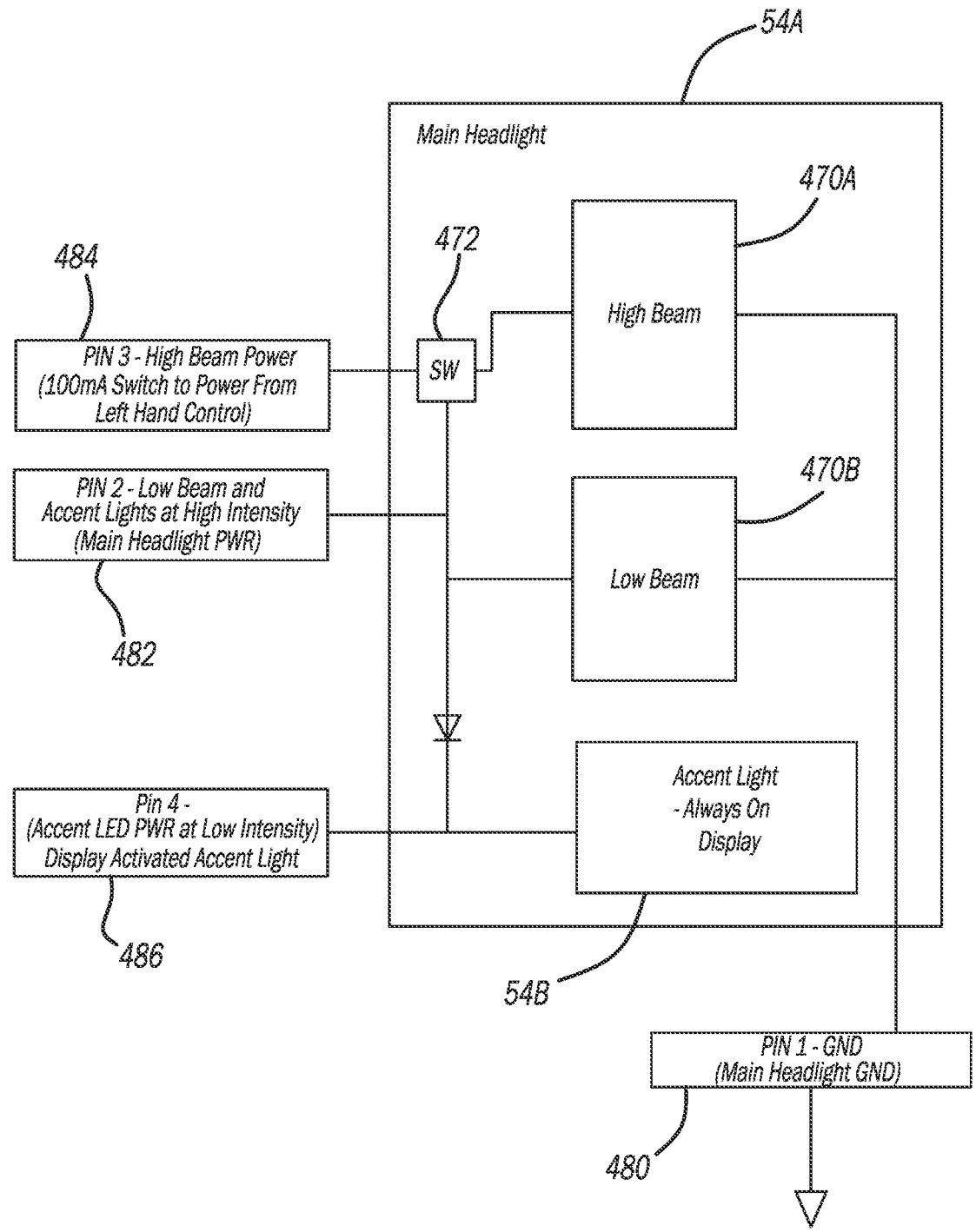
FIG. 14 is a diagram of power inputs to the main headlights and the accent lights.

FIG. 14 illustrates power supply to the main headlights 54A (including high beams 470A and low beams 470B) and the accent lights 54B. The high beams 470A and the low beams 470B are connected to ground at PIN 1 480. Main headlight power for the low beams 470B is provided by way of PIN 2 at 482. When powered, PIN 2 powers both the low beams 470B and the accent light 54B. The accent light 54B is powered at full power, such as at about 330-360 milliamps. Power for the high beams 470A is provided by way of PIN 3 at 484 (100 mA switch to power from left hand control 66). Switch 472 is arranged between PIN 3 and the high beams 470A. Power to the accent lights 54B may be provided by way of PIN 4 at 486, which powers the accent lights 54B by way of the display 58 when the engine is off at a relatively low intensity, such as at about 250 milliamps, as compared to when powered by way of PIN 2. Power can be directed to the high beams 470A, the low beams 470B, and the accent light 54B in any other suitable manner as well, such as by way of any suitable relay.

Figure 15A:
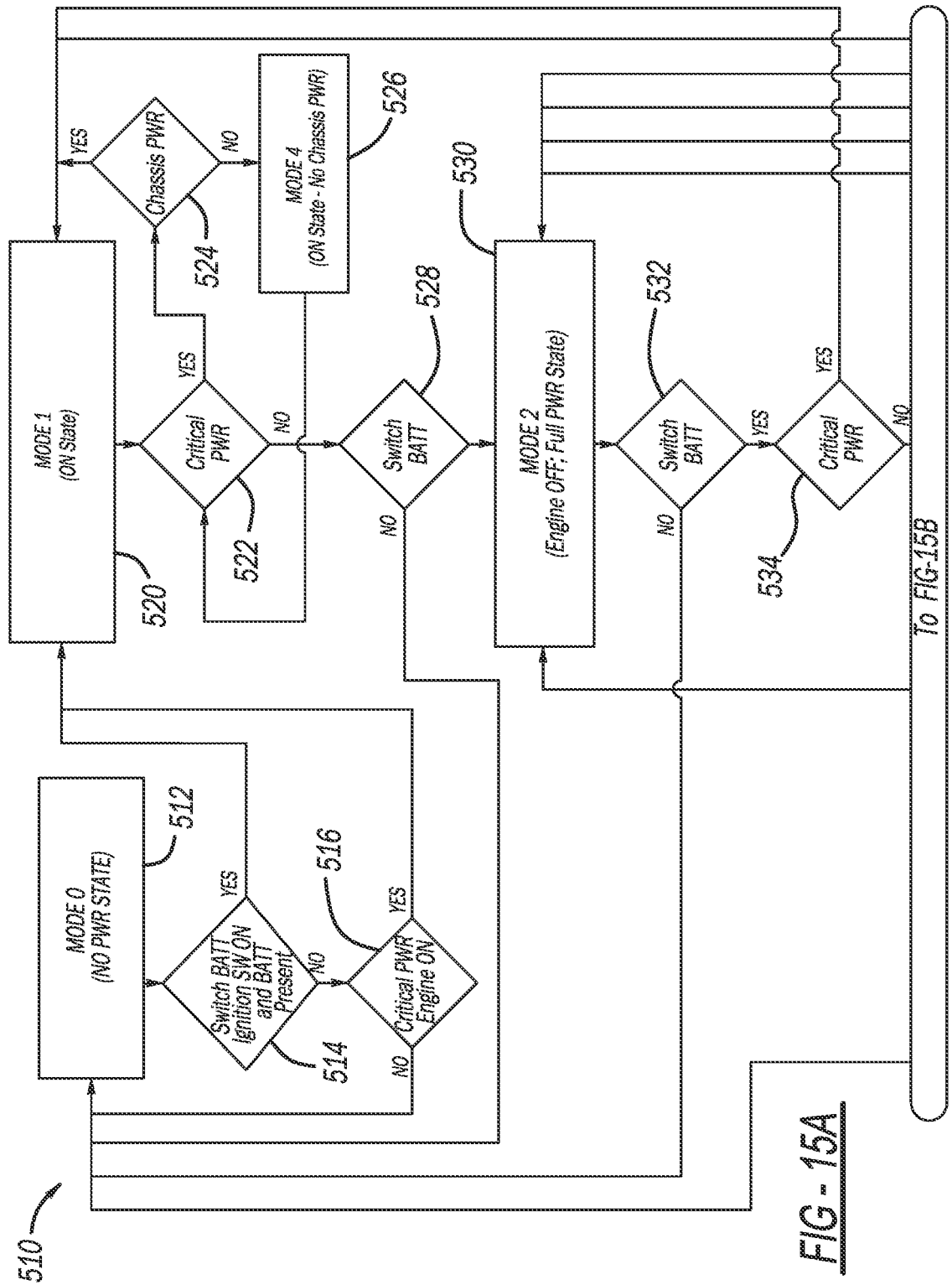
FIG. 15A is a diagram of various power mode states of the snowmobile.
Figure 15B:
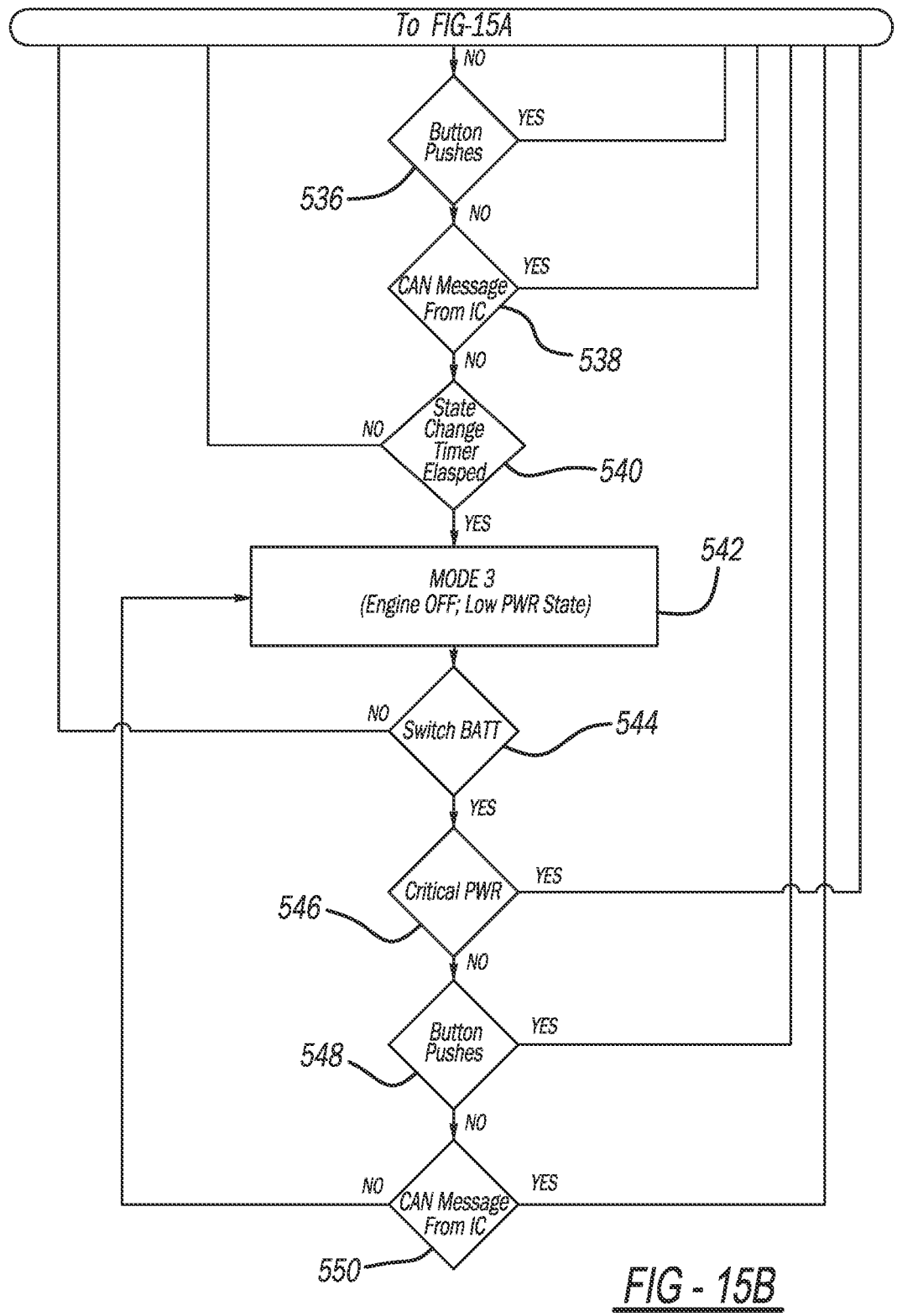
FIG. 15B is a continuation of FIG. 15A.

FIGS. 15A and 15B illustrate exemplary power mode states of the snowmobile 10, and particularly the left hand control assembly 66 thereof, at reference numeral 510. The power mode states include the following: Mode 0 (no power state); Mode 1 (on state); Mode 2 (engine off, full power state); Mode 3 (engine off, low power state); and Mode 4 (on state, no chassis power).

In the no power state of Mode 0, the snowmobile 10 is completely shutdown, there is no critical power, no chassis power, and the left hand control assembly 66 has no functionality.

In the on state of Mode 1, the engine 70 is on and there is critical power (such as at about 14V for example) and chassis power (such as at about 14.4V, for example), but no switched power. In Mode 1, expected functionality includes: CAN communication; headlight control; reverse drive of the snowmobile 10; and control of the heaters, such as the hand warmers 434A, 434B and thumb warmer 436 or any other suitable heaters. No push-to-start functionality is available as there is no battery in the system.

In Mode 2 (engine off, full power state), battery power is available if the snowmobile 10 includes a battery. No critical power or chassis power is available in Mode 2, and thus Mode 2 is only available when the snowmobile 10 includes a battery. Expected functionality in Mode 2 includes CAN communication and push-to-start if the snowmobile 10 is outfitted with such functionality. The following functionality is not available in Mode 2: headlight control, reverse, and control of heaters, such as hand warmers 434A, 434B and thumb warmer 436. Mode 2 permits communication with the instrumentation.

In Mode 3 (engine off, low power state), battery power is available if the snowmobile 10 includes a battery. No critical power or chassis power is available in Mode 3, and thus Mode 3 is only available when the snowmobile 10 includes a battery. The left hand control assembly 66 will wake-up to Mode 2 in response to a button push, receipt of a CAN bus signal, or critical power. The following functionality is not available: CAN communication, headlight control, reverse operation, push-to-start (when the snowmobile is outfitted with such functionality), control of heaters, such as hand warmers 434A, 434B and thumb warmer 436. Mode 3 reduces current draw on the battery when the user forgets to turn the key off. Also, Mode 3 is used to wake up from the lower power state.

In Mode 4 (engine on, no chassis power), battery power is available and critical power is available, such as at about 14V for example. Expected functionality includes: CAN communication, headlight control, and reverse operation. Push-to-start is not available (if included with the snowmobile 10), and there is no control of heaters. Thus in Mode 4 the engine is running, but chassis power is either disabled or not yet turned on by a power boosting regulator (PBR).

The snowmobile 10 is placed in the different power mode states, and the control logic of FIGS. 15A and 15B is executed by, the control module 64A of the left hand control 66. At block 512, the power mode state of the snowmobile 10 is mode 0, which is a no power state. From block 512, the control logic proceeds to block 514. At block 514, the control module 64A checks to determine whether the ignition switch of the snowmobile 10 has been activated and whether a battery (such as the power source 452) is present. If the ignition switch has not been activated and/or no battery is present, the control logic proceeds to block 516. At block 516 the control module 64A determines whether there is critical power and whether the engine is on. If the engine is off and/or critical power is not present, the control logic returns to block 512 and the snowmobile remains in the no power state of mode 0.

If at block 514 the control module 64A determines that the ignition switch is on and a battery is present, the control logic proceeds to block 520. Also, if at block 516 the control module 64A determines that critical power is present and the engine is on, the control logic proceeds to block 520. At block 520, the snowmobile 10 is in mode 1, which is the on state.

From the mode 1 (on state) of block 520, the control logic proceeds to block 522. At block 522, the control module 64A determines whether critical power is present. If critical power is present, the control logic proceeds to block 524. At block 24, the control module 64A determines whether chassis power 524 is present. If chassis power is present, the control module 64A returns block 520, which is the full power on state of mode 1. If at block 524 the control module 64A determines that there is no chassis power, the control logic proceeds to block 526, where the control module 64A operates the snowmobile 10 in mode 4, which is an on state without chassis power. From block 526, the control logic returns to block 522.

If at block 522 the control module 64A determines that critical power is not present, the control logic proceeds to block 528. At block 528, the control module 64A checks for switch battery power. If no battery power is detected at block 528, the control logic proceeds to block 512 where the control module 64A places the snowmobile 10 in power mode state 0, which is the no power state. If at block 528 the control module 64A detects battery power, the control logic proceeds to block 530. At block 530, the control module 64A places the snowmobile 10 in power mode 2, which is an engine off, full power state.

From block 530, the control logic proceeds to block 532. At block 532, the control module 64A checks for battery power. If no battery power is detected, the control logic to block 512, which is the no power state of mode 0. If at block 532 battery power is detected, the control logic proceeds to block 534. At block 534, the control module 64A checks for critical power. If critical power is present, the control logic returns to the on state of power mode state 1.

If at block 534 critical power is not detected, the control logic proceeds to block 536 of FIG. 15B. At block 536, the control module 64A checks for button pushes by the operator, such as actuation of the buttons on the left hand control 66, touch inputs to the display 58, or actuation of the physical controls 152 adjacent to the display 58. If button pushes are detected, the control logic returns block 530 and the control module 64A keeps the snowmobile 10 in the engine off, full power state. If at block 536 no button pushes are detected, the control logic proceeds to block 538. At block 538 the control module 64A checks for a CAN message from an IC. If a CAN message is detected, the control logic returns to block 530 where the engine off, full power state is maintained. If at block 538 no CAN messages are detected, the control logic proceeds to block 540.

At block 540, the control module 64A determines whether a state change timer of the control module 64A has elapsed. If the state change timer has not yet elapsed, the control logic returns to block 530 where the snowmobile is maintained in the engine off, full power state. If the state change timer has elapsed, the control logic proceeds to block 542.

At block 542, the control module 64A places the snowmobile 10 in mode 3, which is an engine off, full power state. From block 542 the control logic proceeds to block 544, where the control module 64A checks for switch battery power. If no such battery power is detected, the control logic returns to block 512 where the control module 64A places the snowmobile 10 in the no power state. If at block 544 battery power is detected, the control logic proceeds to block 546. At block 546, the control module 64A determines whether critical power is present. If critical power is present, the control logic returns to block 530 and the control module 64A places the snowmobile 10 in the engine off, full power state. If at block 546, the control module 64A determines that critical power is not present, the control logic proceeds to block 548 where the control module checks for button pushes, such as actuation of the buttons on the left hand control assembly 66, touch inputs to the display 58, or actuation of the physical controls 152 adjacent to the display 58. If one or more button pushes are detected, the control logic returns to block 530 where the control module 64A places the snowmobile in the engine off, full power state. If at block 548 no button pushes are detected, the control logic proceeds to block 550. At block 550, the control module 64A checks for CAN messages from the IC. If no CAN messages are detected, the control module 64A maintains the snowmobile 10 in the engine off, low power state of mode 3. If at block 550 a CAN message is detected, the control logic returns to block 530 where the control module 64A maintains the snowmobile 10 in the engine off, full power state of mode 2.

Figure 16A:
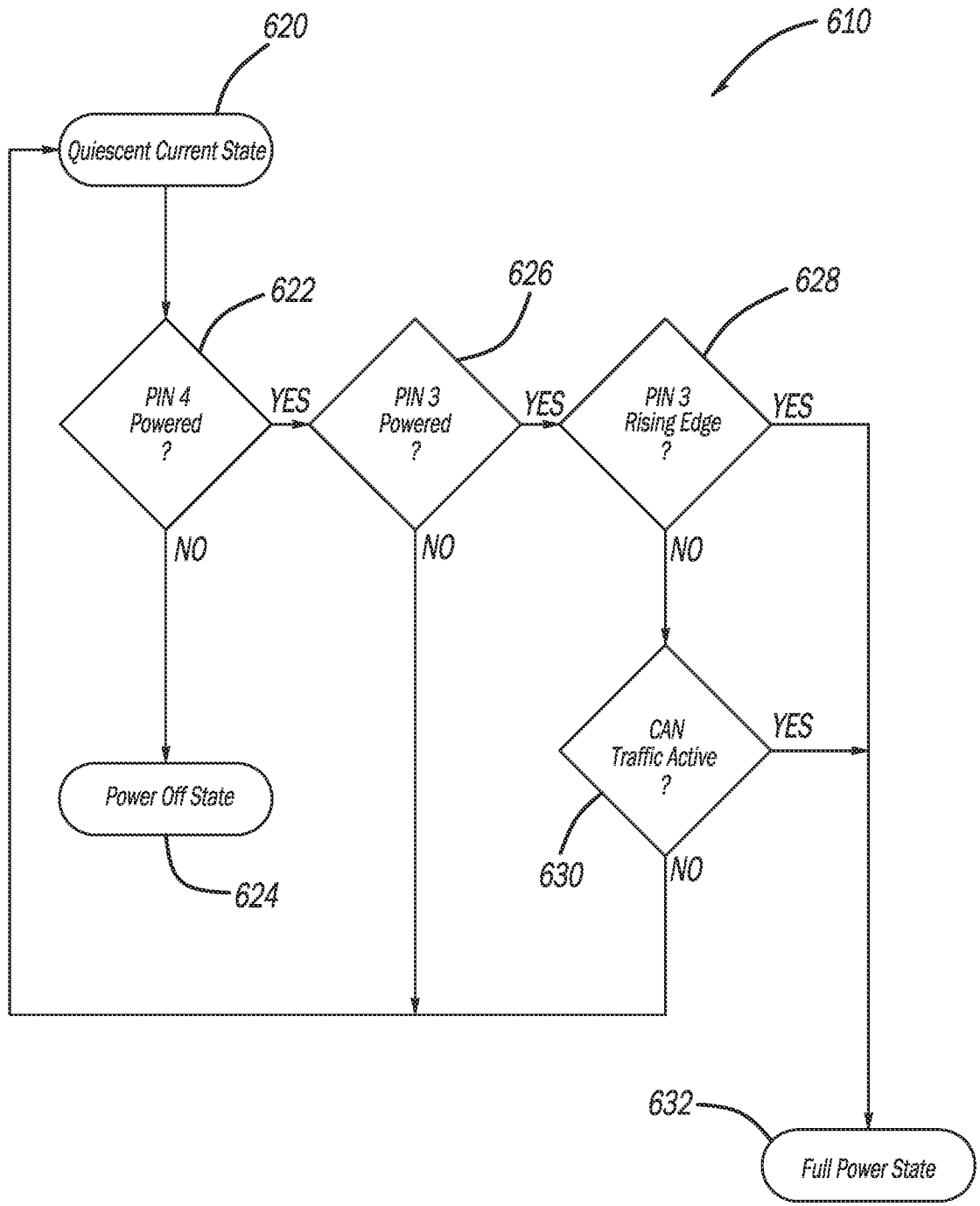
FIG. 16A is a first power stateflow diagram of the snowmobile.

FIG. 16A illustrates an exemplary full power state flow diagram 610 for the display 58, the logic of which is carried out by the control module 64A, for example. At block 620, the display 58 is in the quiescent current state. The quiescent current state is the lowest power state in which everything is off except GPS. Thus the screen is off, the backlight is off, processors are booted down, GPS is off, and the accent lights 54B are off.

At block 622, the control module 64A determines whether PIN 4 is powered. If PIN 4 is not powered, the control module 64A proceeds to the power off state in block 624. If PIN 4 is powered, the control module 64A proceeds from block 622 to block 626. At block 626, the control module 64A determines whether PIN 3 is powered. If PIN 3 is not powered, the control logic returns to block 620 where the control module 64A returns the display 58 to the quiescent current state 620. If at block 626, PIN 3 is powered, the control module 64A determines whether PIN 3 has a rising edge. If a PIN 3 rising edge is detected, the control logic proceeds to block 632, where the control module 64A places the display 58 in a full power state. In the full power state the display 58 is on, the backlight is on, processors are on, GPS is locked, and the accent light 54B is on. If at block 628 no PIN 3 rising edge is detected, the control logic proceeds to block 630. At block 630, the control module 64A checks for CAN traffic. If CAN traffic is detected, the control module 64A proceeds to block 630 and places the display 58 10 in a full power state. If at block 630 no CAN traffic is detected, the control logic returns to block 620 where the control module 64A maintains the quiescent current state.

Figure 16B:
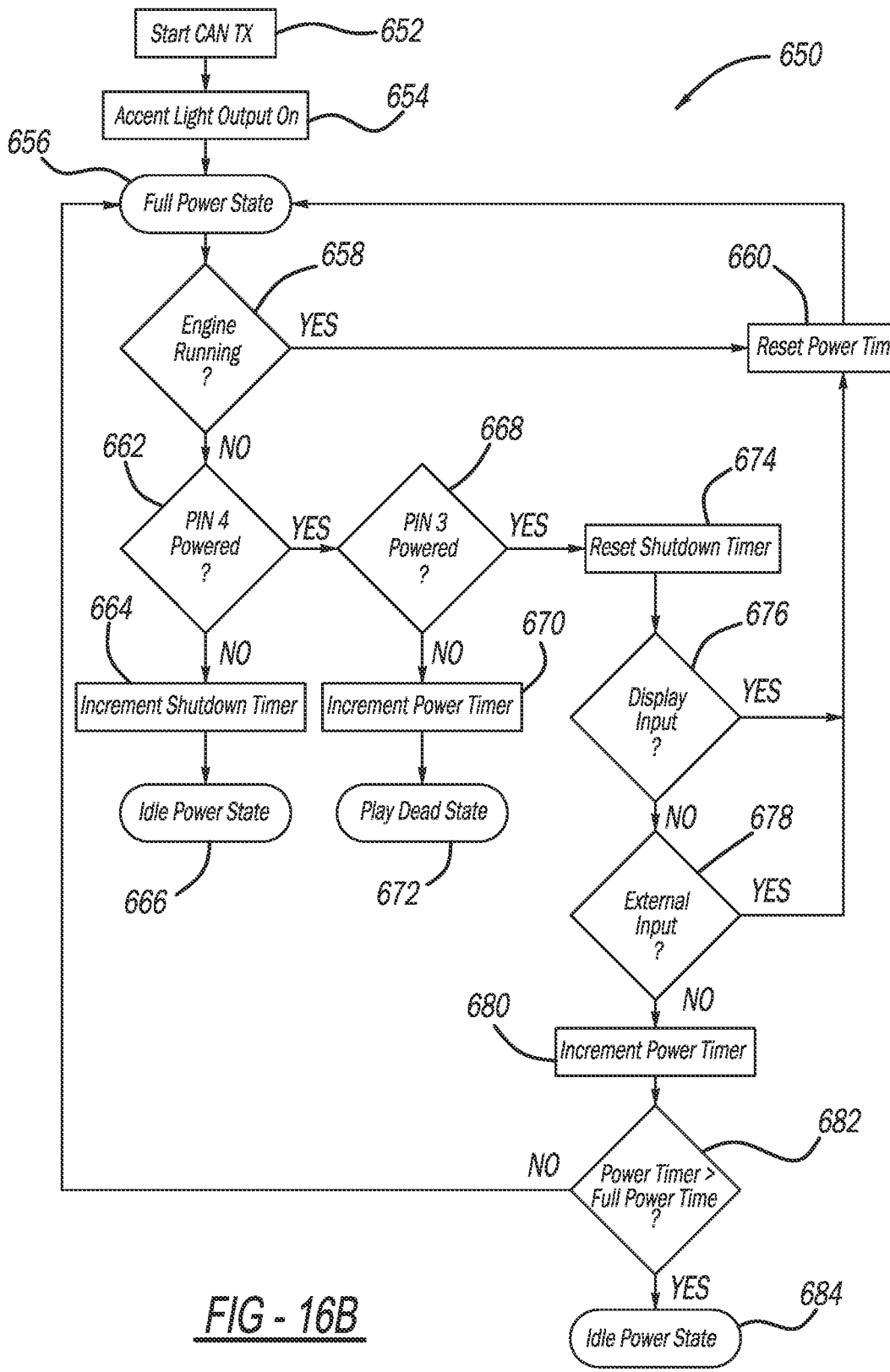
FIG. 16B is a second power stateflow diagram of the snowmobile.

FIG. 16B illustrates another power state flow diagram in accordance with the present disclosure at reference numeral 650. The control logic starts at block 652 with the start of CAN transmission. In response to CAN transmission, the control module 64A activates the accent lights 54B, and at block 656 the control module 64A places the display 58 in the full power state. At block 658, the control module 64A checks whether the engine 70 is running. If the engine 70 is running, the control logic proceeds to block 660 where the control module 64A resets a power timer, and the display 58 remains in the full power state in block 656. If at block 658 the control module 64A determines that the engine is not running, the control logic proceeds to block 662, where the control module 64A determines whether PIN 4 is powered. If PIN 4 is not powered, at block 664 the control module 64A starts an increment shutdown timer, and at block 666 the control module 64A places the display 58 in the idle power state. The increment shutdown timer is designated to keep track of the time the display has been unpowered before imitating a software shutdown at 850 of FIG. 16E. The idle power state is a standby/idle power state designated for reducing load on the battery while keeping GPS locked and the processor alive. The display screen is off, the backlight is off, processors remain booted, GPS remains locked, the display 58 responds to display and external inputs, and the accent light 54B is off.

If at block 662 PIN 4 is powered, the control logic proceeds to block 668, where the control module 64A determines whether PIN 3 is powered. If PIN 3 is not powered, control module 64A initiates an increment power timer at block 670. Upon expiration of the increment power timer 670, the control logic proceeds to block 672, where in the control module 64A places the display 58 in the play dead state. The increment power timer is designated to keep track of time the display 58 has been in a certain state of the power management strategy. The play dead state is a standby/idle power state designated for reducing load on the battery while keeping GPS locked and the processor alive. The screen of the display 58 is off, the backlight is off, processors remain booted, GPS is locked, display and external inputs are not responded to, and the accent lights 54B are off.

If at block 668 PIN 3 is powered, the control logic proceeds to block 674 where the control module 64A resets a shutdown timer. Once the shutdown timer has been reset, the control logic proceeds to block 676 where the control module 64A checks for inputs to the display 58, such as touch inputs or actuation of the physical controls 152 adjacent to the display 58. If display inputs are detected, the control module 64A resets the power timer at block 660 and the full power state is maintained. If at block 676 no display inputs are detected, the control module 64A checks for external inputs at block 678. If external inputs are detected, the control module 64A resets the power timer at block 660 and the full power state is maintained. If at block 678 no external inputs are detected, the control logic proceeds to block 680, where the control module 64A activates the increment power timer. At block 682, if the power timer is greater than full power time, the logic proceeds to block 684 where the control module 64A places the display 58 in the idle power state. If the power timer is not greater than the full power time, then the control logic returns to block 656, where the full power state is maintained. The full power time is a calibratable parameter designated as the time threshold the display 58 stays in full power mode without display button presses, hand control button presses, and engine not running. The full power time is stored in memory of the control module 64A or 64B, has a default of 30 seconds, a range of 6 hours, and a resolution of 5 seconds.

Figure 16C:
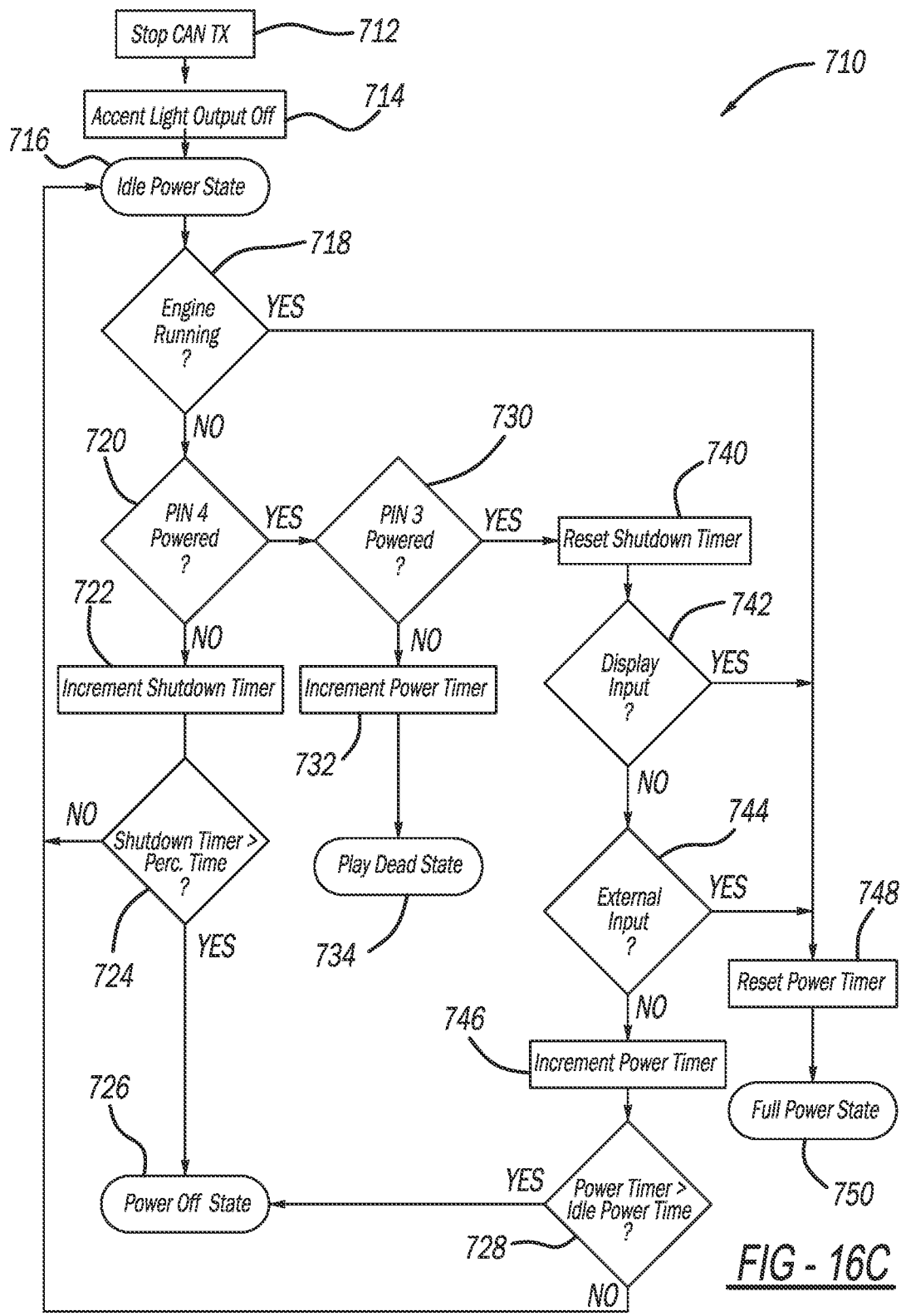
FIG. 16C is a third power stateflow diagram of the snowmobile.

With reference to FIG. 16C, another power state flow diagram is illustrated at reference numeral 710. In response to a stop CAN transmission at block 712, the control module 64A turns off the accent light 54B at block 714 and places the display 58 in the idle power state at block 716. From block 716, the control logic proceeds to block 718, where the control module 64A determines whether the engine 70 is running. If the engine 70 is running, the control logic proceeds to block 748, where the control module 64A resets the power timer and places the display 58 in the full power state at block 750.

If at block 718 the engine is not running, the control logic proceeds to block 720, where the control module 64A determines whether PIN 4 is powered. If PIN 4 is not powered, the control logic proceeds to block 722, where the control module 64A activates an increment shutdown timer. At block 724, the control module 64A checks whether the shutdown timer is greater than the perc. time. The perc. time is a calibratable parameter designated as the time threshold the display 58 waits until initiating software shutdown at 850 of FIG. 16E. The perc. time has a default of 500 ms, a range of 10 seconds, and a resolution of 10 ms. If the shutdown timer is greater, the control logic returns to block 716, where the display 58 is maintained in the idle power state. If at block 724 the shutdown timer is not greater than the perc. time, the control module 64A places the display 58 in the power off state at block 726. If at block 720 PIN 4 is powered, the control module 64A checks whether PIN 3 is powered at block 730. If PIN 3 is not powered, the control module 64A activates the increment power timer at block 732, and then places the display 58 in the play dead state at block 734.

If at block 730 PIN 3 is powered, the control module 64A resets the shutdown timer at block 740. From block 740, the control module 64A checks for display inputs at block 742. If display inputs are detected, the control module 64A resets the power timer at block 748, and places the display 58 in the full power state at block 750. If at block 742 no display inputs are detected, the control module 64A checks for external inputs at block 744. If external inputs are detected, the control module 64A resets the power timer at block 748, and places the display 58 in the full power state at block 750. If no external inputs are detected, the control module 64A activates the increment power timer at block 746. If at block 728 the power timer is greater than the idle power time, the control module 64A places the display 58 in the power off state at block 726. If the power timer is not greater than the idle power time, then the control logic proceeds to block 716, and the control module 64A maintains the display 58 in the idle power state. The idle power time is a calibratable parameter designated as the time threshold the display 58 stays in idle power mode without a display input, hand control input, and engine not running. The idle power time is stored in memory of the control module 64A or 64B, has a default of 120 seconds, has a range of 6 hours, and a resolution of 10 seconds.

Figure 16D:
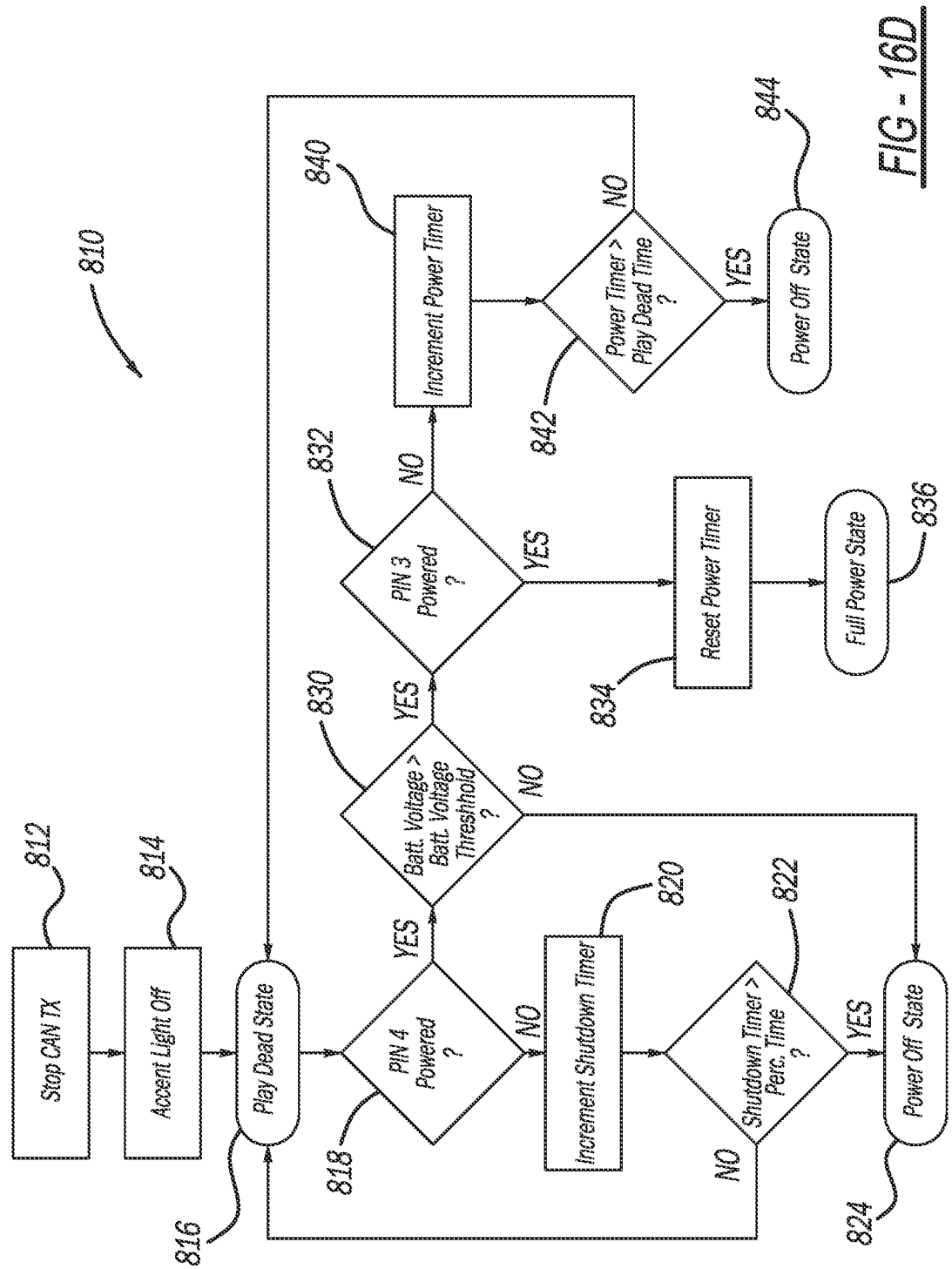
FIG. 16D is a fourth power stateflow diagram of the snowmobile.

FIG. 16D illustrates another exemplary power state flow diagram in accordance with the present disclosure at reference numeral 810. In response to a stop CAN transmission at block 812, the control module 64A powers off the accent lights at block 814 and places the display 58 in the play dead state at block 816. At block 818, the control module 64A checks for power at PIN 4. If PIN 4 is not powered, the control module 64A activates the increment shutdown timer at block 820. At block 822, the control module 64A checks whether the shutdown timer is greater than the perc. time. If the shutdown timer is not greater than the perc. time, the control module 64A maintains the display 58 in the play dead state at block 816. If the shutdown timer is greater than the perc. time, the control module 64A places the display 58 in the power off state at block 824.

If PIN 4 is powered at block 818, the control module 64A checks whether the battery voltage is greater than a predetermined battery voltage threshold at block 830. The battery voltage threshold is a calibratable parameter designated as the threshold where the display 58 decides there is not sufficient charge in the battery and initiates a software shutdown at 850 of FIG. 16E. The battery voltage threshold has a default of 8V, a range of 0-14V, and a resolution of 0.1V. If the battery voltage is not greater than the predetermined threshold, the control module 64A places the display 58 in the power off state at block 824. If the battery voltage is greater than the predetermined threshold, the control module 64A checks whether PIN 3 is powered at block 832. If PIN 3 is powered, the control module 64A resets the power time at block 834, and places the display 58 in the full power state at block 836. If PIN 3 is not powered, the control module 64A activates the increment power timer at block 840, and at block 842 the control module 64A checks whether the power timer is greater than the play dead time. If the power timer is greater than the play dead time, the control module 64A places the display 58 in the power off state at block 844. If the power timer is not greater than the play dead time, the control module 64A maintains the display 58 in the play dead state at block 816. The play dead time is a calibratable parameter designated as the time threshold the display 58 stays in play dead mode (key switch off, engine not running). The play dead time is stored in the control module 64A or 64B, has a default time of 120 seconds, a range of 6 hours, and a resolution of 10 seconds.

Figure 16E:
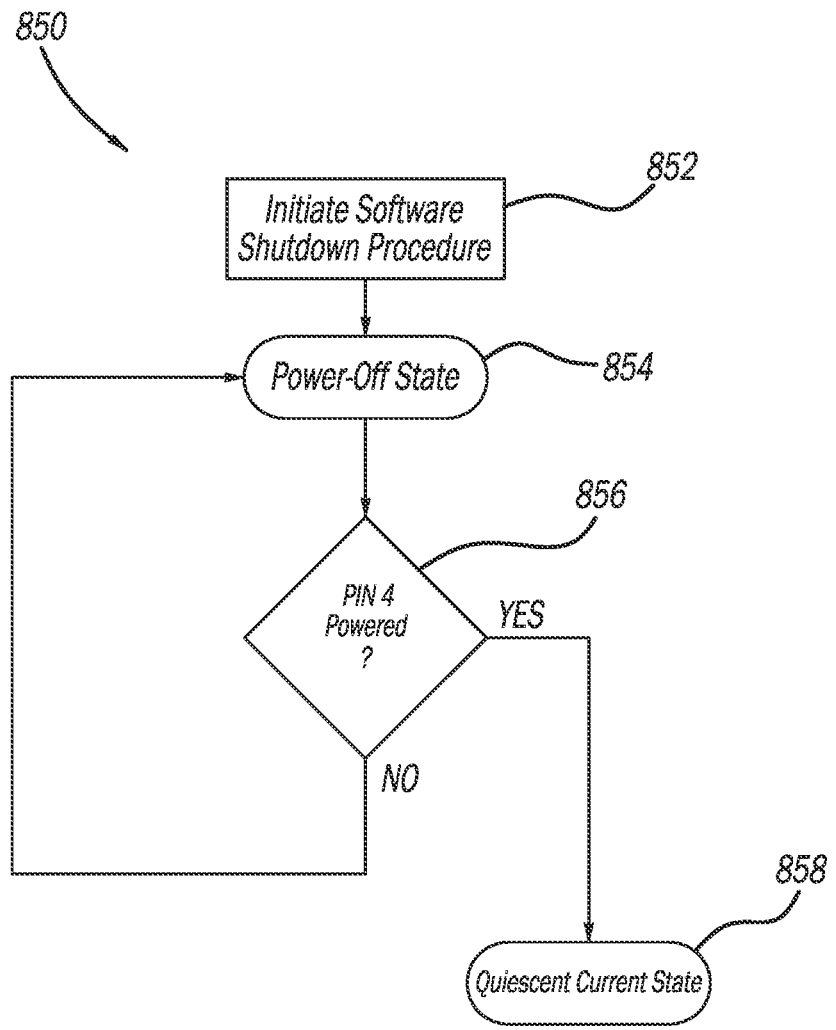
FIG. 16E is a fifth power stateflow diagram of the snowmobile.

FIG. 16E illustrates another power state flow diagram in accordance with the present disclosure at reference numeral 850 for the software shutdown procedure. At block 852, the control module 64A initiates the software shutdown procedure, and places the display 58 in the power off state at block 854. At block 856, the control module 64A checks whether PIN 4 is powered. If PIN 4 is not powered, the control module 64A maintains the display 58 in the power off state at block 854. If PIN 4 is powered, the control module 64A places the display 58 in the quiescent current state.

Figure 17:
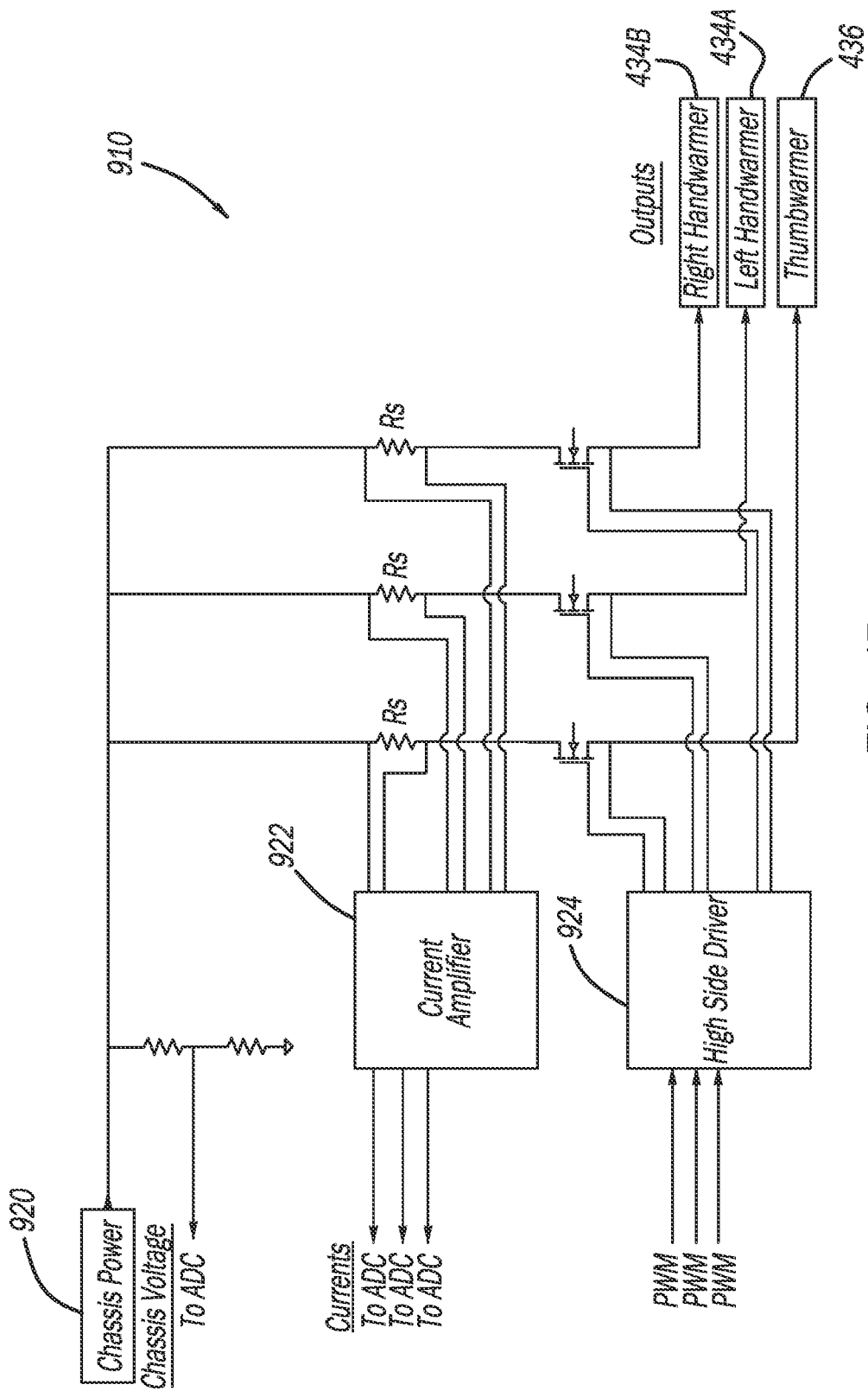
FIG. 17 is a diagram of current flow to hand and thumb warmers of the snowmobile.

The circuitry of FIG. 17 may be included with the snowmobile 10 at any suitable location. For example, the circuitry of FIG. 17 may be included within the left hand control assembly 66 on a printed circuit board thereof. The printed circuit board may also include the control module 64A and a CAN transceiver. FIG. 17 illustrates current flow to the right hand warmer 434B, the left hand warmer 434A and the thumb warmer 436 of the handle bars 26. In the example of FIG. 17, power is provided by way of chassis power 920. A current amplifier is included at reference numeral 922 and one or more high side drivers are included at reference numeral 924. For each warmer (or group of warmers), over which individual temperature control is desired, a separate high side driver 924 is included. For example, to control the temperature of the hand warmers 434A, 434B together such that the temperature of the left hand warmer 434A is the same as the right hand warmer 434B, one high side driver 924 is included for the hand warmers 434A, 434B. To control the temperature of the left hand warmer 434A independent of the right hand warmer 434B, separate high side drivers 924 for the hand warmers 434A, 434B are included. To control the temperature of the thumb warmer 436 independent of the hand warmers 434A and 434B, another high side driver 924 is included for the thumb warmer 436. Any suitable number of additional high side drivers 924 may be included to individually control the temperature of any other warmers, such as, but not limited to, the following warmers: brake handle warmer; storage compartment warmer; goggles warmer; garment warmer; windshield warmer; helmet shield warmer; seat warmer; etc. The high side driver 924 is driven by pulse width modulation (PWM), which advantageously allows for customized temperature settings of the left hand warmer 434A, the right hand warmer 434B, and the thumb warmer 436 by the operator as explained above, where the user is able to set preferred temperatures for the low, medium and high temperature settings of the hand warmers 434A, 434B and the thumb warmer 436.

Figure 18A:
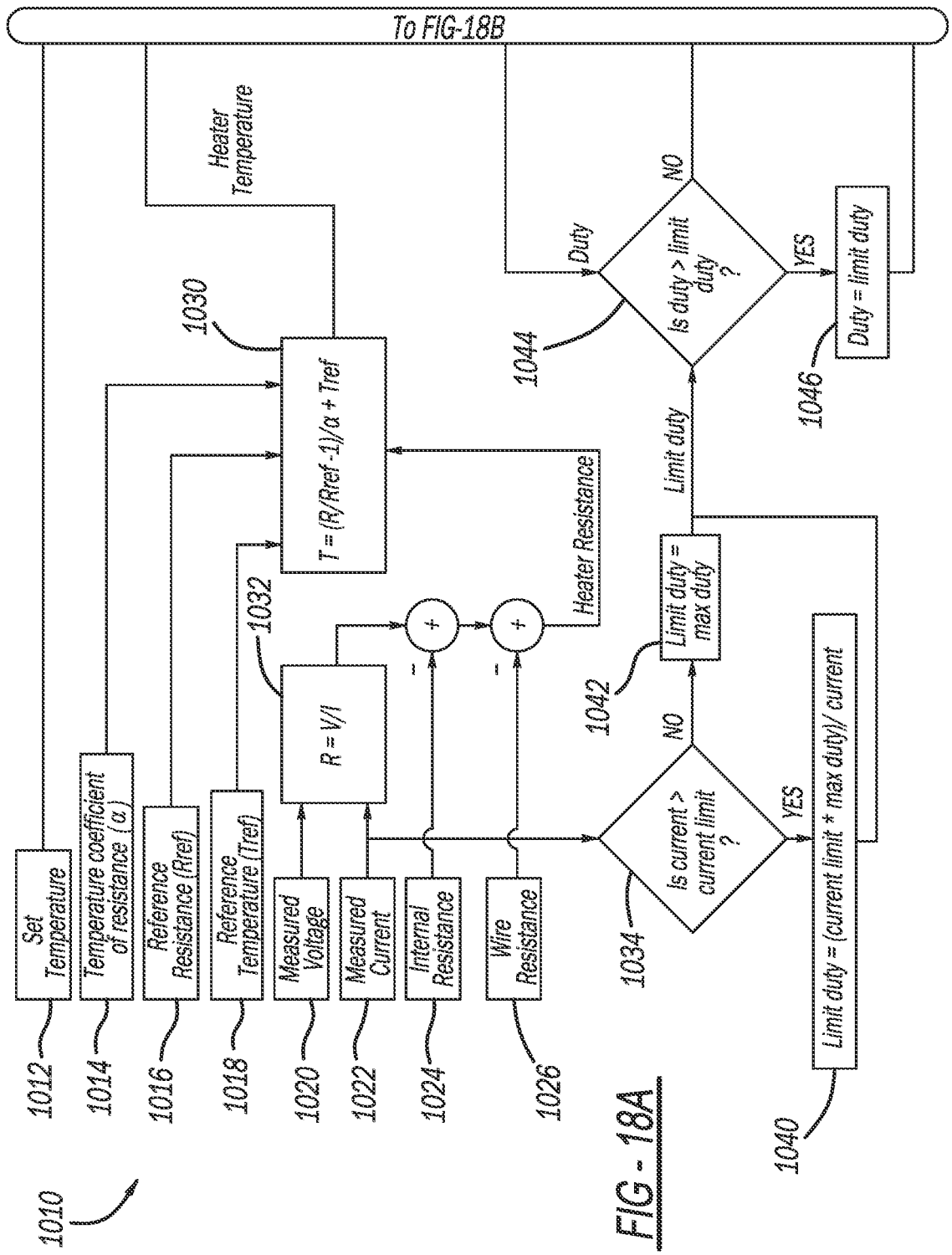
FIG. 18A is a resistive control flowchart for the hand and thumb warmers.
Figure 18B:
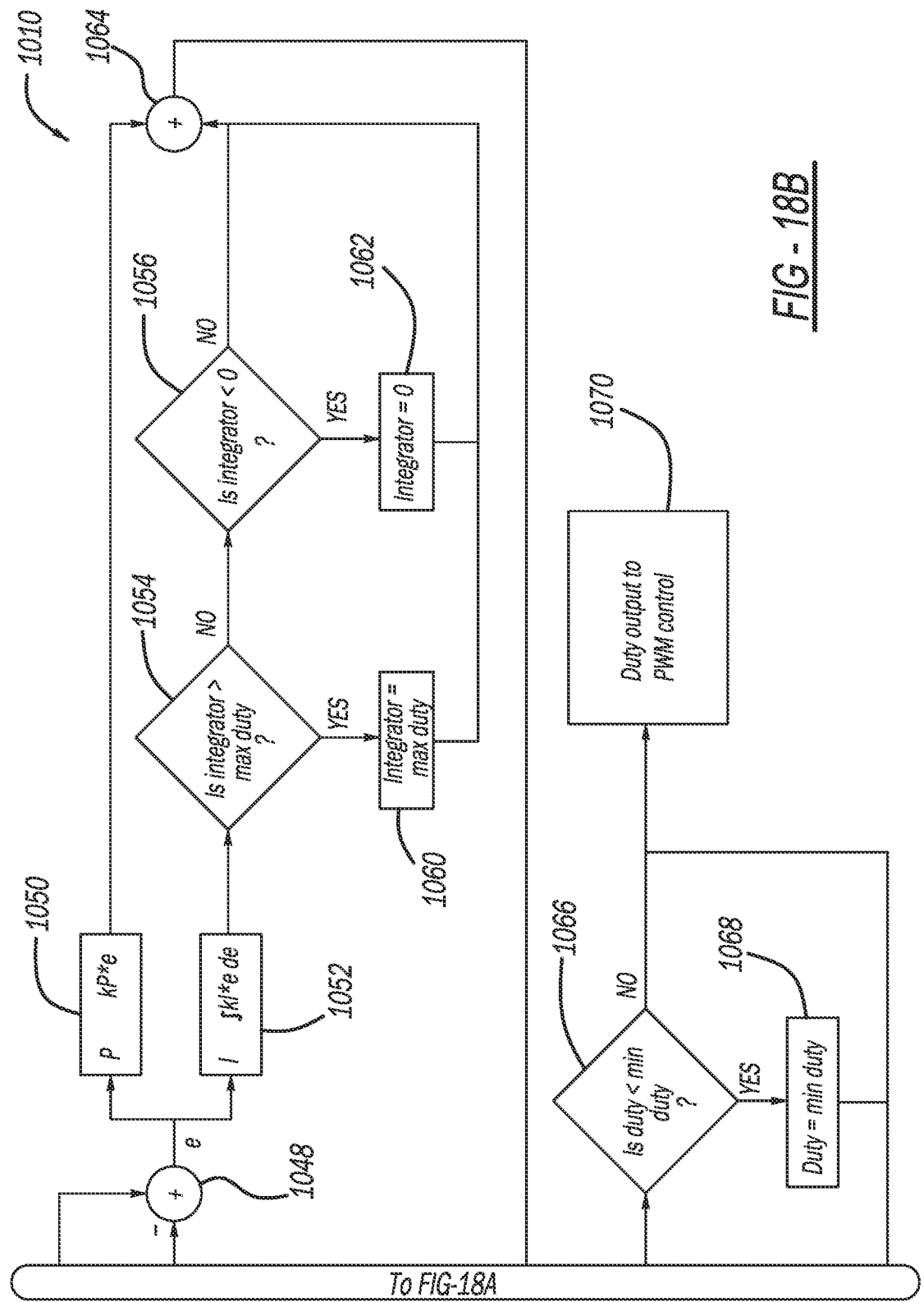
FIG. 18B is a continuation of FIG. 18A.

FIGS. 18A and 18B illustrate exemplary resistive control diagrams for controlling the left hand warmer 434A, the right hand warmer 434B and the thumb warmer 436. Beginning at block 1012, temperature of the hand warmers 434A, 434B and the thumb warmer 436 is set by the operator, such as by way of the display screen 432 of FIG. 10B as described above. The temperature of the left hand warmer 434A, the right hand warmer 434B and the thumb warmer 436 is determined at block 1030 based on numerous inputs, such as the following: temperature coefficient of resistance (a) 1014; reference resistance (Rref) 1016; and reference temperature (Tref) 1018. At block 1030, the temperature is also determined based on heater resistance including: measured voltage 1020; measured current 1022; internal resistance 1024; and wire resistance 1026. At block 1032, heater resistance R=measured voltage (V) of block 1020 divided by measured current (I) of block 1022. At block 1030, heater temperature equals (R/Rref−1/α+Tref). Both the set temperature 1012 and the heater temperature calculated at block 1030 are input to block 1048.

At block 1048, the difference node for command value—measured is determined to arrive at the control error "e". At block 1050, peak coefficient "P" is determined as follows kP*e. At block 1052, an integrator is determined as follows ∫ki*e dt). At block 1054, the control module 64A determines whether the integrator is greater than maximum duty. If the integrator is greater than maximum duty, then the control module 64A sets the integrator to equal maximum duty at block 1060. From block 1060, the control logic proceeds to block 1064, where the duty is determined as the sum of peak coefficient (P) and integrator (I). If at block 1054 the integrator is not greater than maximum duty, the control module 64A checks whether the integrator is less than 0 at block 1056. If the integrator is less than 0, then at 1062, the integrator is set to 0. If the integrator is not less than 0, then the control logic proceeds to block 1064. From block 1064, the control logic proceeds to block 1044 of FIG. 18A. At block 1044, the control module 64A determines whether duty is greater than limit duty.

Limit duty is determined at blocks 1034, 1040, and 1042. At block 1034, the control module 64A determines whether the measured current 1022 is greater than a predetermined current limit. If the measured current 1022 is not greater than the current limit, then at block 1042 the limit duty is set to equal a predetermined maximum duty. If at block 1034 the measured current 1022 is greater than the current limit, then at block 1040 the control module 64A sets the limit duty as follows: limit duty equals (current limit*maximum duty)/current.

At block 1044, the control module 64A determines whether the duty from block 1064 is greater than the limit duty from blocks 1040, 1042. If at block 1044 the duty is greater than the limit duty, at block 1046, the duty is set to equal the limit duty, and the control logic proceeds to block 1070, and the duty is output to PWM control, which is input to the high side driver 924 of FIG. 17 for driving the right hand warmer 434B, the left hand warmer 434A and/or the thumb warmer 436. If at block 1044, the duty is not greater than the limit duty, at block 1066 the control module 64A determines whether the duty is less than the minimum duty. If the duty is less than the minimum duty, then at block 1068 the duty is set to equal the minimum duty, which is output to PWM control at block 1070. If at block 1066 the duty is not less than the minimum duty, then the duty is output to PWM control at block 1070.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A snowmobile comprising:
    a hand warmer and a thumb warmer at a handlebar of the snowmobile configured to generate heat in response to electrical current driven therethrough;
    a user interface configured to receive inputs from an operator of the snowmobile, the inputs including:
        a first hand warmer temperature input setting a first hand warmer predetermined temperature in degrees of temperature,
        a second hand warmer temperature input setting a second hand warmer predetermined temperature in degrees of temperature,
        a first thumb warmer temperature input setting a first thumb warmer predetermined temperature in degrees of temperature, and
        a second thumb warmer temperature input setting a second thumb warmer predetermined temperature in degrees of temperature,
        wherein each of the first hand warmer predetermined temperature, the second hand warmer predetermined temperature, the first thumb warmer predetermined temperature, and the second thumb warmer predetermined temperature are different degrees of temperature;
    a control assembly including a warmer control button configured for simultaneously setting the hand warmer at the first hand warmer predetermined temperature and the thumb warmer at the first thumb warmer predetermined temperature in response to a first actuation of the warmer control button, and configured for simultaneously setting the hand warmer at the second hand warmer predetermined temperature and the thumb warmer at the second thumb warmer predetermined temperature in response to a second actuation of the warmer control button;

temperature sensors configured to sense temperature of the hand warmer and the thumb warmer; and a control module integrated with the control assembly and in receipt of inputs from the user interface, the control assembly, and the temperature sensors, the control module configured to:

when the first hand warmer predetermined temperature and the first thumb warmer predetermined temperature are simultaneously selected by way of the warmer control button, direct sufficient electrical current to the hand warmer to generate heat equal to the first hand warmer predetermined temperature, direct sufficient electrical current to the thumb warmer to generate heat equal to the first thumb warmer predetermined temperature, monitor temperatures of the hand warmer and the thumb warmer based on temperature inputs received from the temperature sensors, and regulate electrical current to each of the hand warmer and the thumb warmer to maintain the hand warmer at the first hand warmer predetermined temperature and maintain the thumb warmer at the first thumb warmer predetermined temperature; and when the second hand warmer predetermined temperature and the second thumb warmer predetermined temperature are simultaneously selected by way of the warmer control button, direct sufficient electrical current to the hand warmer to generate heat equal to the second hand warmer predetermined temperature, direct sufficient electrical current to the thumb warmer to generate heat equal to the second thumb warmer predetermined temperature, monitor temperatures of the hand warmer and the thumb warmer based on temperature inputs received from the temperature sensors, and regulate electrical current to each of the hand warmer and the thumb warmer to maintain the hand warmer at the second hand warmer predetermined temperature and maintain the thumb warmer at the second thumb warmer predetermined temperature.

2. The snowmobile of claim 1, wherein the control assembly further includes at least one of an engine start button for electronic engine start, a high beam control button, an electronic shock absorber adjustment button, a multimedia control button, and a menu control button.

3. The snowmobile of claim 1, wherein the control assembly further includes a driver for driving electrical current to the hand warmer and thumb warmer by pulse-width modulation.

4. The snowmobile of claim 1, wherein the user interface includes a display screen.

5. The snowmobile of claim 1, wherein:
the user interface is further configured to receive a third temperature input setting a third predetermined temperature for the thumb warmer; and
the control module is configured to, when the third predetermined temperature is selected by way of the warmer control button, direct sufficient electrical current to the thumb warmer to generate heat equal to the third predetermined temperature.

6. The snowmobile of claim 5, wherein the third predetermined temperature is different from each of the first predetermined temperature and the second predetermined temperature.

7. The snowmobile of claim 1, wherein the control assembly is mounted to a handlebar of the snowmobile.

8. The snowmobile of claim 7, wherein the control assembly mounted to the handlebar further includes a driver configured to drive current to the hand warmer and thumb warmer.

* * * * *